US012670392B2

(12) United States Patent
Baker

(10) Patent No.: US 12,670,392 B2
(45) Date of Patent: Jun. 30, 2026

(54) MACHINE LEARNING ROBUSTNESS THROUGH SENSIBLE DECISION BOUNDARIES

(71) Applicant: D5AI LLC, Maitland, FL (US)

(72) Inventor: James K. Baker, Maitland, FL (US)

(73) Assignee: D5AI LLC, Maitland, FL (US)

( * ) Notice: Subject to any disclaimer, the term of this patent is extended or adjusted under 35 U.S.C. 154(b) by 0 days.

(21) Appl. No.: 19/058,350

(22) Filed: Feb. 20, 2025

(65) Prior Publication Data

US 2025/0190796 A1     Jun. 12, 2025

Related U.S. Application Data

(60) Continuation of application No. 18/377,899, filed on Oct. 9, 2023, now Pat. No. 12,242,965, which is a
(Continued)

(51) Int. Cl.
*G06N 3/08* (2023.01)
*G06N 3/04* (2023.01)

(52) U.S. Cl.
CPC ................. *G06N 3/08* (2013.01); *G06N 3/04* (2013.01)

(58) Field of Classification Search
CPC ............ G06N 3/02; G06N 3/08; G06N 3/084; G06N 3/0895; G06N 3/09; G06N 3/091;
(Continued)

(56) References Cited

U.S. PATENT DOCUMENTS 9,779,355 B1    10/2017  Leobandung
10,515,306 B1   12/2019  David et al.
(Continued)

FOREIGN PATENT DOCUMENTS

WO      2018/226492 A1    12/2018
WO      2019/067542 A1    4/2019
(Continued)

OTHER PUBLICATIONS

Ma et al., "Kernal Machines that Adapt to GPUs for Effective Large Batch Training", Apr. 2, 2019, Proceedings of the Second Conference on Machine Learning and System, pp. 1-14. (Year: 2019).*
(Continued)

*Primary Examiner* — Paulinho E Smith
(74) *Attorney, Agent, or Firm* — K&L Gates LLP

(57) ABSTRACT

Computer systems and computer-implemented methods modify a machine learning network, such as a deep neural network, to introduce judgment to the network. A "combining" node is added to the network, to thereby generate a modified network, where activation of the combining node is based, at least in part, on output from a subject node of the network. The computer system then trains the modified network by, for each training data item in a set of training data, performing forward and back propagation computations through the modified network, where the backward propagation computation through the modified network comprises computing estimated partial derivatives of an error function of an objective for the network, except that the combining node selectively blocks back-propagation of estimated partial derivatives to the subject node, even though activation of the combining node is based on the activation of the subject node.

27 Claims, 15 Drawing Sheets

Related U.S. Application Data continuation of application No. 18/333,870, filed on Jun. 13, 2023, now Pat. No. 11,847,566, which is a division of application No. 18/181,948, filed on Mar. 10, 2023, now Pat. No. 11,797,852, which is a division of application No. 17/753,061, filed as application No. PCT/US2020/043885 on Jul. 28, 2020, now Pat. No. 11,836,624.

(60) Provisional application No. 62/891,610, filed on Aug. 26, 2019.

(58) Field of Classification Search
CPC ........ G06N 3/092; G06N 3/094; G06N 3/098; G06N 3/0985; G06N 20/20; G06N 20/10; G06N 20/00; G06N 3/04
See application file for complete search history.

(56) References Cited

U.S. PATENT DOCUMENTS

| | | | |
|---|---|---|---|
| 10,929,757 B2 | 2/2021 | Baker et al. | |
| 10,956,818 B2 | 3/2021 | Baker | |
| 11,003,982 B2 | 5/2021 | Baker | |
| 11,010,671 B2 | 5/2021 | Baker et al. | |
| 11,037,059 B2 | 6/2021 | Baker | |
| 11,074,506 B2 | 7/2021 | Baker et al. | |
| 11,151,455 B2 | 10/2021 | Baker et al. | |
| 2016/0162781 A1 | 6/2016 | Lillicrap et al. | |
| 2016/0307096 A1 | 10/2016 | Goel et al. | |
| 2016/0321540 A1 | 11/2016 | Towal | |
| 2016/0342889 A1 | 11/2016 | Thorson et al. | |
| 2017/0091619 A1 | 3/2017 | Towal et al. | |
| 2017/0103194 A1* | 4/2017 | Wechsler | G06F 21/316 |
| 2017/0132866 A1* | 5/2017 | Kuklinski | G07D 7/2083 |
| 2017/0286830 A1 | 10/2017 | El-Yaniv et al. | |
| 2019/0080236 A1 | 3/2019 | Maruhashi | |
| 2019/0188569 A1 | 6/2019 | Naumov | |
| 2019/0236454 A1 | 8/2019 | Fok et al. | |
| 2019/0377819 A1* | 12/2019 | Filliben | G06N 3/084 |
| 2020/0090045 A1 | 3/2020 | Baker | |
| 2020/0143240 A1 | 5/2020 | Baker | |
| 2020/0196870 A1* | 6/2020 | Feng | A61B 5/0073 |
| 2020/0210812 A1* | 7/2020 | Baker | G06N 3/044 |
| 2020/0265336 A1* | 8/2020 | Merrill | G06N 5/045 |
| 2020/0279188 A1 | 9/2020 | Baker et al. | |
| 2020/0293890 A1 | 9/2020 | Baker | |
| 2020/0293897 A1 | 9/2020 | Baker | |
| 2020/0311572 A1 | 10/2020 | Baker | |
| 2020/0327455 A1 | 10/2020 | Baker | |
| 2020/0334541 A1 | 10/2020 | Baker et al. | |
| 2020/0342317 A1 | 10/2020 | Baker et al. | |
| 2020/0349446 A1 | 11/2020 | Baker et al. | |
| 2020/0356861 A1 | 11/2020 | Baker et al. | |
| 2020/0364625 A1 | 11/2020 | Baker et al. | |
| 2020/0387794 A1 | 12/2020 | Baker | |
| 2020/0394521 A1 | 12/2020 | Baker | |
| 2020/0401869 A1 | 12/2020 | Baker et al. | |
| 2020/0410090 A1 | 12/2020 | Baker | |
| 2020/0410295 A1 | 12/2020 | Baker | |
| 2021/0004688 A1 | 1/2021 | Baker | |
| 2021/0027147 A1 | 1/2021 | Baker | |
| 2021/0027163 A1 | 1/2021 | Baker et al. | |
| 2021/0049470 A1 | 2/2021 | Baker | |
| 2022/0383111 A1* | 12/2022 | Baker | G06N 3/045 |
| 2023/0222311 A1* | 7/2023 | Otte | G06N 20/00 |
| | | | 706/25 |

FOREIGN PATENT DOCUMENTS

| | | |
|---|---|---|
| WO | 2021/040944 A1 | 3/2021 |
| WO | 2021/061401 A1 | 4/2021 |
| WO | 2021/194516 A1 | 9/2021 |

OTHER PUBLICATIONS

Tama et al., "Performance Evaluation of Intrusion Detection System Using Classifier Ensembles", Jan. 2017, International Journal of Internet Proctocol Technology, vol. 10, No. 1, pp. 21-29.*

Thaseen et al., "Integrated Intrusion Detection Model Using Chi-Square Feature Selection and Ensemble Classifiers", Aug. 29, 2018, Arabian Journal for Science and Engineering, pp. 3357-3368. (Year: 2018).*

Wang et al., "Regularization for Unsupervised Deep Neural Networks", 2017, AAAI Conference, pp. 2681-2687 (Year: 2017).

Masters et al., Revisiting Small Batch Training for Deep neural networks, Apr. 2018, pp. 1-18 (Year: 2018).

International Search Report and Written Opinion of the International Searching Authority for International Application No. PCT/US2020/043885 mailed Dec. 16, 2020.

Chen et al., "Pipelined Back-Propagation for Context-Dependent Deep Nueral Networks", Interspeech, Sep. 2012.

Gadea et al., "Artificial Neural Network Implementaion on a Single FPGA of a Pipelined On-Line Backpropagation", Conference Paper, Jan. 2000.

Taghi et al., "Training RBF networks with selective backpropagation", Neurocomputing, 62, 2004, pp. 39-64.

Mostafa et al., "Hardware-Efficient On-line Learning through Pipelined Truncated-Error Backpropagation in Binary-State Networks", Frontiers in Neuroscience, Sep. 2017, vol. 11, Article 496, 15 pages.

Petrowski et al., "Performance Analysis of a Pipelined Backpropagation Parallel Algorithm", IEEE Transactions on Neural Networks, vol. 4, No. 6, Nov. 1993, pp. 970-981.

Gunther et al., "neuralnet: Training of Neural Networks", The R Journal, vol. 2/1, Jun. 2010, pp. 30-38.

Baram et al., "Model-based Adversarial Imitation Learning" (2016).

* cited by examiner

FIGURE 5B

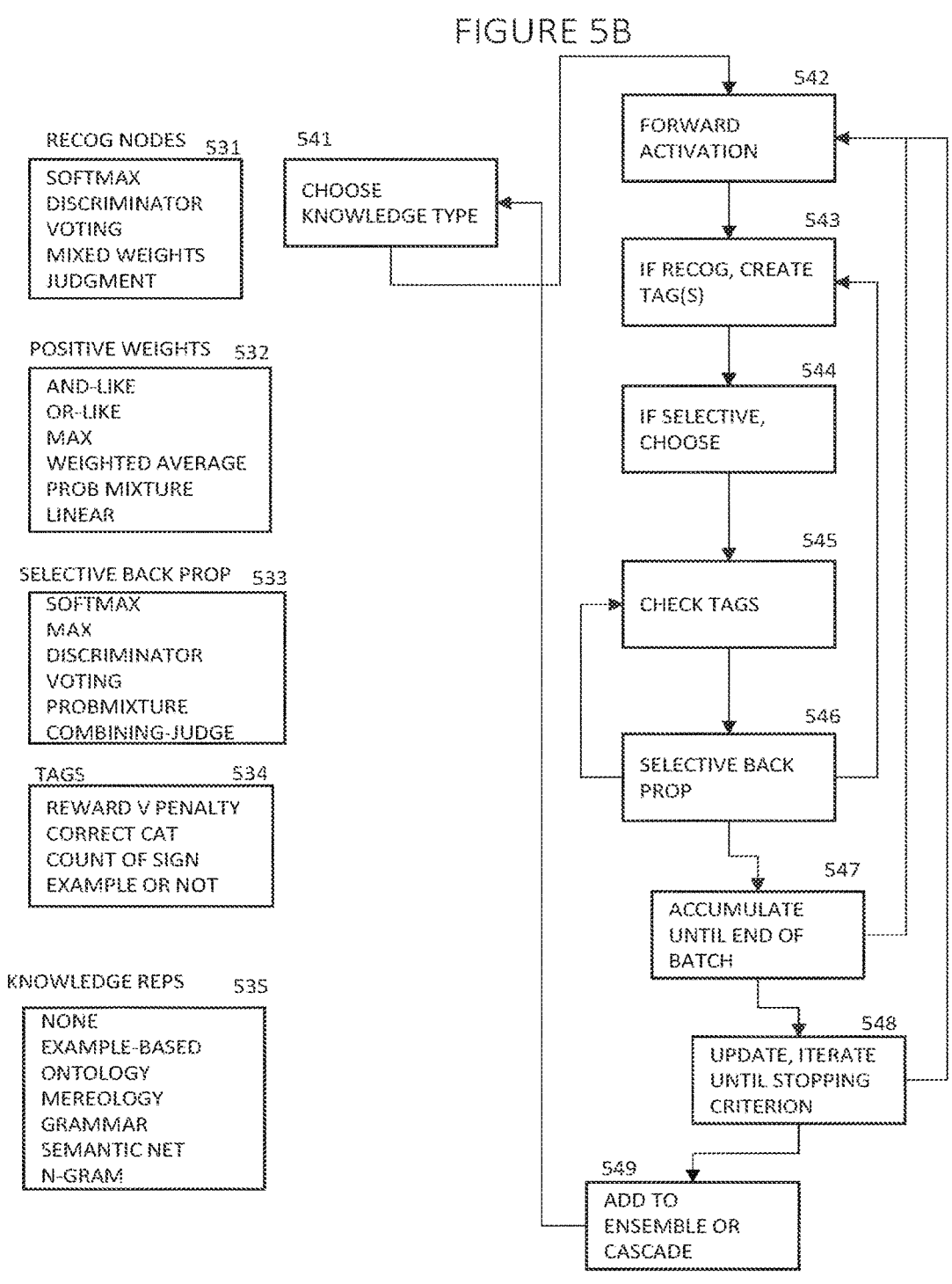

RECOG NODES 531
SOFTMAX
DISCRIMINATOR
VOTING
MIXED WEIGHTS
JUDGMENT

POSITIVE WEIGHTS 532
AND-LIKE
OR-LIKE
MAX
WEIGHTED AVERAGE
PROB MIXTURE
LINEAR

SELECTIVE BACK PROP 533
SOFTMAX
MAX
DISCRIMINATOR
VOTING
PROBMIXTURE
COMBINING-JUDGE

TAGS 534
REWARD V PENALTY
CORRECT CAT
COUNT OF SIGN
EXAMPLE OR NOT

KNOWLEDGE REPS 535
NONE
EXAMPLE-BASED
ONTOLOGY
MEREOLOGY
GRAMMAR
SEMANTIC NET
N-GRAM

541
CHOOSE
KNOWLEDGE TYPE

542
FORWARD
ACTIVATION

543
IF RECOG, CREATE
TAG(S)

544
IF SELECTIVE,
CHOOSE

545
CHECK TAGS

546
SELECTIVE BACK
PROP

547
ACCUMULATE
UNTIL END OF
BATCH

548
UPDATE, ITERATE
UNTIL STOPPING
CRITERION

549
ADD TO
ENSEMBLE OR
CASCADE

FIGURE 7

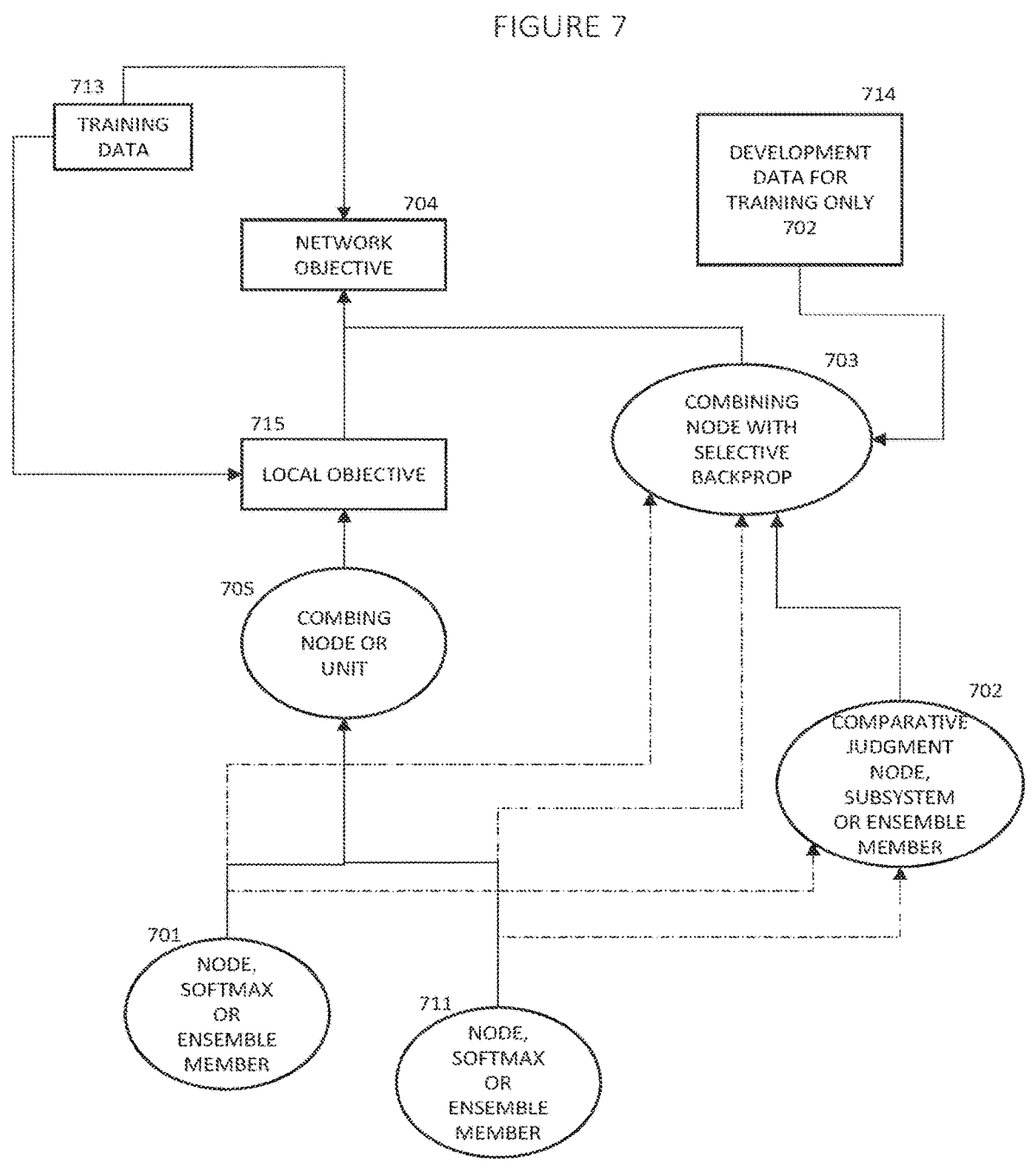

713
TRAINING
DATA

714
DEVELOPMENT
DATA FOR
TRAINING ONLY
702

704
NETWORK
OBJECTIVE

703
COMBINING
NODE WITH
SELECTIVE
BACKPROP

715
LOCAL OBJECTIVE

705
COMBING
NODE OR
UNIT

702
COMPARATIVE
JUDGMENT
NODE,
SUBSYSTEM
OR ENSEMBLE
MEMBER

701
NODE,
SOFTMAX
OR
ENSEMBLE
MEMBER

711
NODE,
SOFTMAX
OR
ENSEMBLE
MEMBER

○    NORMAL NODE

◇    ERROR JUDGMENT NODE

⬠    COMBINING NODE

☐    PROGRESS JUDGMENT NODE

⬡    SUBSYSTEM

⬡    SELECTIVE BACKPROP NODE

▽    LOOK-AHEAD JUDGMENT
     NODE

———▶    NORMAL CONNECTION

—·—·—▶    SELECTIVE BACKPROP

·········▶    BACKPROP CONTROL

—·—·—▶    LARGE STEP CONTROL

FIGURE 13

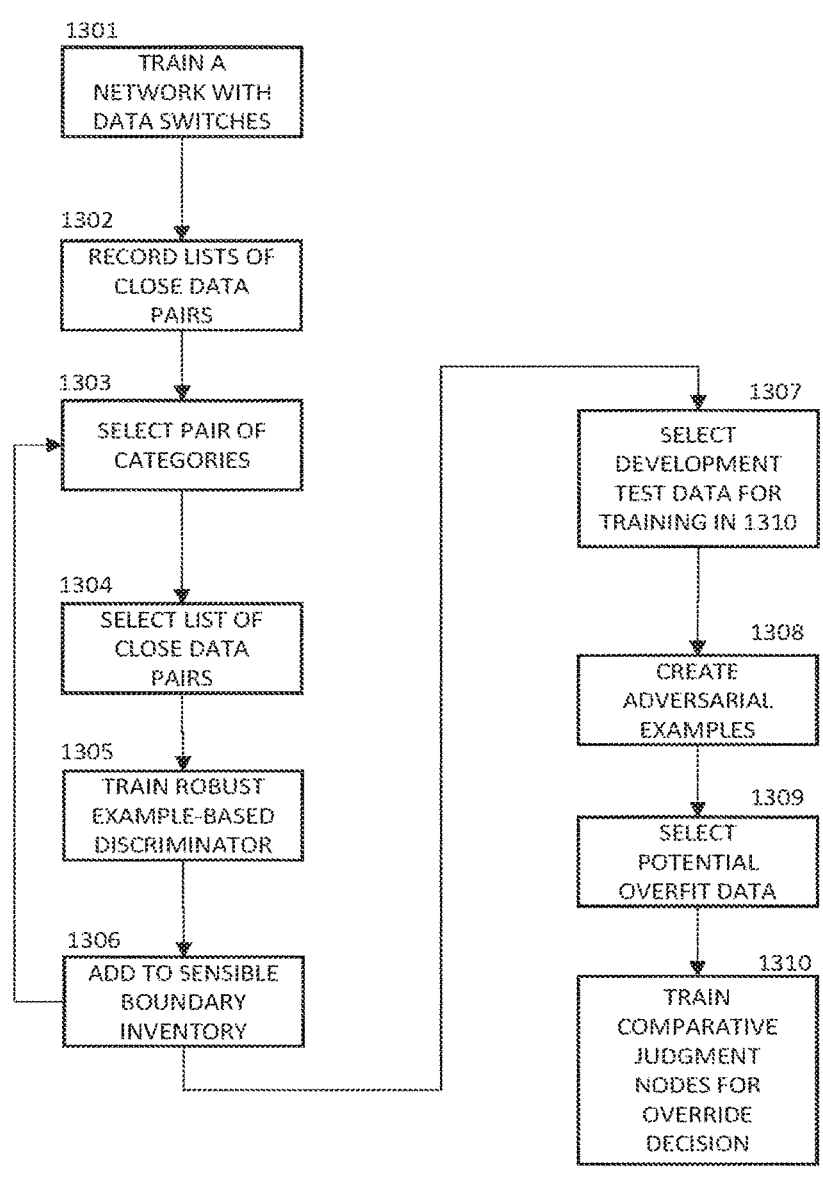

1301
TRAIN A
NETWORK WITH
DATA SWITCHES

1302
RECORD LISTS OF
CLOSE DATA
PAIRS

1303
SELECT PAIR OF
CATEGORIES

1304
SELECT LIST OF
CLOSE DATA
PAIRS

1305
TRAIN ROBUST
EXAMPLE-BASED
DISCRIMINATOR

1306
ADD TO SENSIBLE
BOUNDARY
INVENTORY

1307
SELECT
DEVELOPMENT
TEST DATA FOR
TRAINING IN 1310

1308
CREATE
ADVERSARIAL
EXAMPLES

1309
SELECT
POTENTIAL
OVERFIT DATA

1310
TRAIN
COMPARATIVE
JUDGMENT
NODES FOR
OVERRIDE
DECISION

MACHINE LEARNING ROBUSTNESS THROUGH SENSIBLE DECISION BOUNDARIES

PRIORITY CLAIM

The present application is a continuation application claiming priority to U.S. application Ser. No. 18/377,899, filed Oct. 9, 2023, now U.S. Pat. No. 12,242,965, issued Mar. 4, 2025, which is a continuation of U.S. patent application Ser. No. 18/333,870, filed Jun. 13, 2023, now U.S. Pat. No. 11,847,566, issued Dec. 19, 2023, which is a divisional application claiming priority to U.S. application Ser. No. 18/181,948, filed Mar. 10, 2023, now U.S. Pat. No. 11,797,852, issued Oct. 24, 2023, which is a divisional application claiming priority to U.S. application Ser. No. 17/753,061, filed Feb. 17, 2022, now U.S. Pat. No. 11,836, 624, issued Dec. 5, 2023, which is a national stage application under 35 U.S.C. § 371 of PCT Application No. PCT/US20/43885, filed Jul. 28, 2020, which claims priority to U.S. provisional patent application Ser. No. 62/891,610, filed Aug. 26, 2019, having the same title and inventor as indicated above, and which is incorporated herein by reference in its entirety.

BACKGROUND

Deep neural networks trained by back propagation and stochastic gradient descent based on mini-batches have been very successful in recent years, but many problems and limitations remain. Gradient descent is very myopic. It is based entirely on the local value of the derivative and in any one update does not evaluate the objective beyond an infinitesimal neighborhood. In the optimization of complex functions in very high dimensional spaces, such as in deep learning, it may be very slow. That is, it can take millions of iterations to converge. Gradient descent is especially slow near saddle points of the error function of the objective. Gradient descent makes no attempt to represent sequential logic or conscious reasoning. The gradient of a discrete-valued logic function is zero almost everywhere and non-existent at the discontinuities in the discrete-valued logic function.

Separate from the limitations of gradient descent, deep neural networks have many problems of their own. In a large neural network, it can be very difficult or impossible to interpret what the network has learned or to understand the computation that it is doing for a particular datum. Nodes in inner layers of a deep neural network are especially difficult to interpret. It is difficult to apply human expertise in the training of a deep neural network.

To the extent that deep neural networks are "intelligent" and can be viewed directly or indirectly as modeling the human brain, they model the subconscious brain, rather than the conscious brain with step-by-step conscious reasoning. Deep neural networks can implicitly learn an enormous amount but are generally poor at explicit representation of knowledge. Not only is it hard for humans to interpret the internal nodes of a deep neural network, the training of internal nodes is not easily transferred to a network with a different architecture. Indeed, the accepted definition of "transfer learning" assumes the transfer of knowledge is between two systems with the same architecture, rather than referring to knowledge transfer in general.

Deep neural networks are unable to communicate knowledge that any intelligent person with comparable knowledge could communicate. Deep neural networks are poor at communication not only with humans, but also with other machines. They are unable to answer questions about what they know, how they acquired that knowledge, and what is the evidence for or against any putative fact or conclusion.

Deep neural networks also lack introspection. They lack Socratic wisdom, that is, they "don't know what (it is that) they don't know."

Still further, deep neural networks are notoriously vulnerable to adversarial attacks that would not fool any person. The decision boundaries in a deep neural network classifier are not "sensible." That is, for the vast majority of points on the decision boundary, no person would agree that the data equally represents the two choices. In adversarial attacks that are misrecognized by a deep neural image classifier, a misclassified image often looks exactly like an example of the correct classification and nothing like an example of the category mistakenly chosen by the deep neural network. This is evidence not only that deep neural networks are vulnerable to adversarial attacks, but that the mistakes are unreasonable and that the decision boundary is not in a sensible location. This problem is not limited to one type of network architecture but seems to be inherent in trying to draw boundaries in a very high-dimensional parameter space.

In the conventional training paradigm, the back-propagation value is a purely numerical quantity that does not distinguish based on the cause of the error or close call. For example, it does not attempt to determine whether the correct answer received a score lower than it should or an incorrect answer received a score higher than it should. The distinction between the two causes is useful in diagnosing the problem and in choosing the best corrective action. However, back propagation of the net numerical value of the partial derivatives of the error function is the sum of multiple influences and cannot represent the distinction.

The conventional training paradigm also lacks a hypothesize-and-verify process. It lacks independent assessment of component subsystems. Early stopping, a widely used, recommended "best practice," stops all training without assessing whether training should have been stopped even earlier for some parts of the network or whether some parts of the network could continue to improve with further training.

Training by gradient descent using the chain rule estimate of the gradient does not integrate smoothly with other machine learning methods that do not use gradient descent or with external explicit representations of knowledge.

In building and training large ensembles, there is a problem that is not specific to deep neural networks, but that occurs for all high-performance machine learning systems. With a plurality of high-performance machine learning systems, each member of a large ensemble has a low error rate. As the number of members in the ensemble grows, it becomes increasingly difficult to maintain diversity among the ensemble members.

SUMMARY

The present invention addresses many of the problems described above for existing machine-learning system by, for example, casing interpretation and the need for introspection of machine learning systems. The present invention can also provide more explicit representation of knowledge of a machine learning network, as well as make machine learning networks more robust against adversarial attacks. It can also generate decision boundaries (e.g., for classifiers and discriminators) that make sense. The present invention can also allow back propagation based on the cause of an error or close call, as well as customize early stopping of training and avoiding overfitting of the machine learning system to the training data. The present invention also provides means to diversify a machine learning ensemble.

In one general aspect, the present invention is directed to computer systems and computer-implemented methods for modifying a machine learning network, such as a deep neural network, to introduce judgment to the network. Assume that the machine learning network comprises a plurality of layers and a plurality of nodes, where each layer comprises one or more nodes, with at least one of the nodes being considered a "subject" node. A computer system according to embodiments of the present invention is programmed to add a so-called "combining" node to the network, to thereby generate a modified network, where activation of the combining node is based, at least in part, on output from (e.g., the activation value of) the subject node. The computer system then trains the modified network by, for each training data item in a set of training data, performing forward and back propagation computations through the modified network, where the forward propagation computation includes computing an activation value for each of the plurality of nodes of the modified network, and the backward propagation computation through the modified network comprises computing estimated partial derivatives of an error function of an objective for the network, except that the combining node selectively blocks propagation of estimated partial derivatives to the subject node, even though activation of the combining node is based on the activation of the subject node.

In various embodiments, the computer system adds a second, "judgment" node to the network, where, in one embodiment, activation of the combining node is based on the activation values of both the subject node and the second node. The judgment node may have a specialized function, i.e., a function that is not directly related to achieving the objective for the network (e.g., correctly classifying or discriminating data items). In one embodiment, the function of the judgment node may be to judge whether the subject node has the correct activation for the datum currently presented to the modified network in the training. That is, for example, the activation value of the judgment node is based on assessment of whether the activation value of the subject node is correct for the particular training data item. As such, the activation of the combining node is based on the activation value of the subject node as well as the assessment from the judgment node as to whether the activation value of the subject node is correct. In other embodiments, the activation value of the judgment node could be based on the performance progress of the subject node toward the network's objective during the course of the training process. Also, the second node could predict which of two nodes (or network subsystems) is correct on any datum on which they disagree.

In other embodiments described below, the present invention can: determine a local objective for an inner layer node of the network for the purpose of enabling the training of a datum-specific performance prediction node (e.g., an error judgment node) of the performance of the inner layer node relative to that objective; treat rewards and penalties differently from each other during back propagation; enable substantial acceleration of the training process; and make sensible and robust decision boundaries.

These and other benefits of the present invention will be apparent from the description that follows.

BRIEF DESCRIPTION OF FIGURES

Various embodiments of the present invention are described herein by way of example in connection with the following figures.

FIG. 5B is a diagram of an illustrative embodiment of a further aspect of the invention related to the aspect of the invention illustrated in FIG. 5.

FIG. 7 is an illustrative embodiment of an aspect of the invention comprising a comparative judgment node.

FIG. 13 is a diagram of an illustrative embodiment of an aspect of the invention that may increase the sensibility and robustness of the decision boundaries.

DESCRIPTION

Figure 1:
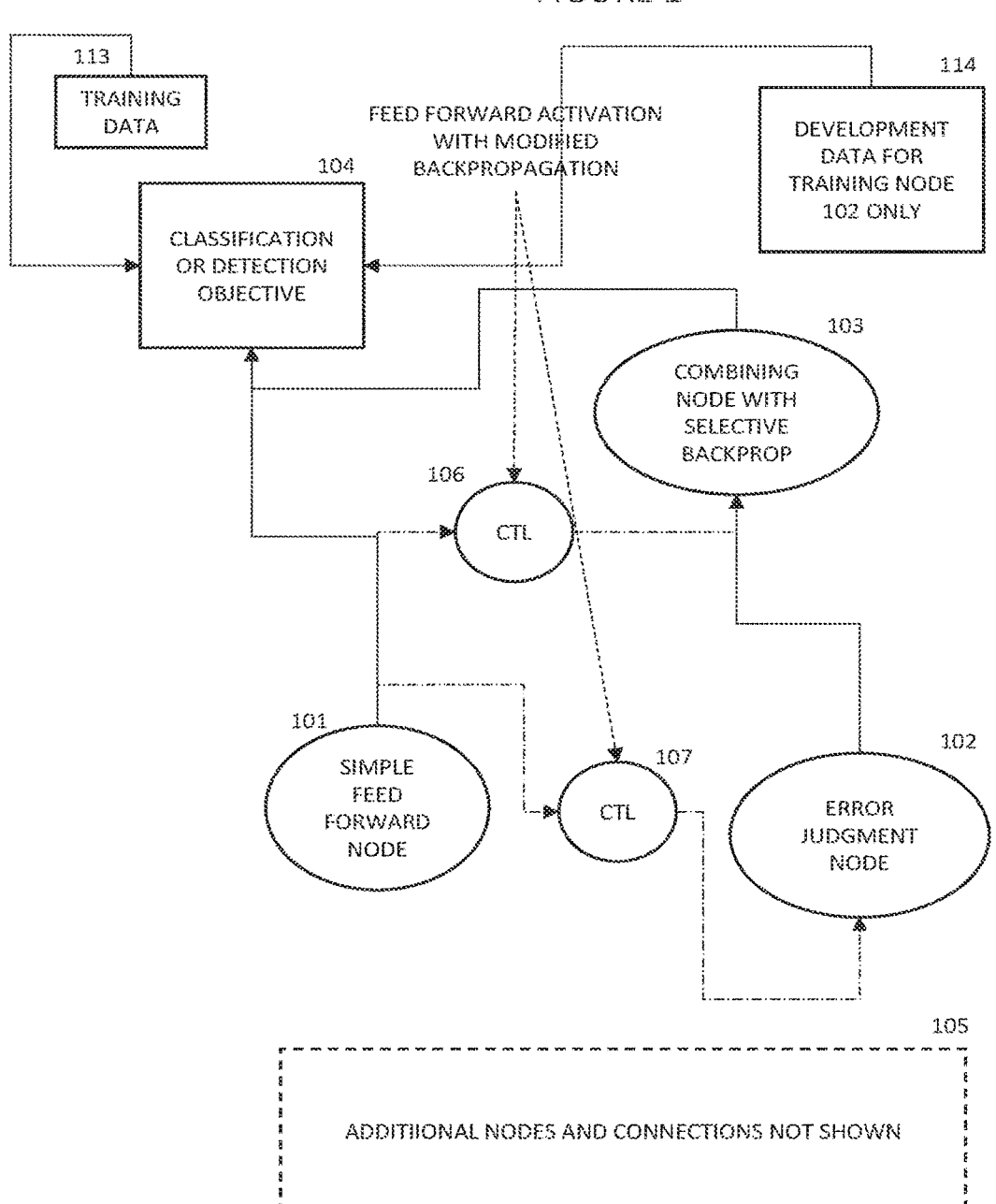
FIG. 1 is a diagram of an illustrative embodiment of an aspect of the invention comprising a datum-specific performance prediction node and selective back propagation.

FIG. 1 is a diagram of an embodiment of an illustrative aspect of the present invention. In FIG. 1, node 101 is a node in a directed acyclic graph or network, such as a deep neural network or other type of machine learning network, represented on a system of one or more computers, such as the computer system 1000 shown in FIG. 10. During the training of the learned parameters of the network, the computer system 1000 performs various computations, comprising (i) a feedforward computation that proceeds in the direction of the directed arcs of the directed acyclic graph proceeding from input variables associated with input nodes to output nodes, and further comprising (ii) a second computation that proceeds backwards from the output nodes back through the network to the input nodes. These feedforward and backward propagation computations are performed iteratively for numerous training data items in a set of training data items (e.g., a minibatch of training data items, as explained herein). Such forward and backward computations are used, for example, in training neural networks. However, various embodiments of the present invention comprise significant differences from the backwards computation usually used in training neural networks. The embodiment illustrated in FIG. 1 will be explained by summarizing the conventional training computation for a neural network and then contrasting that with the computation performed in the embodiment illustrated in FIG. 1.

Figure 11:
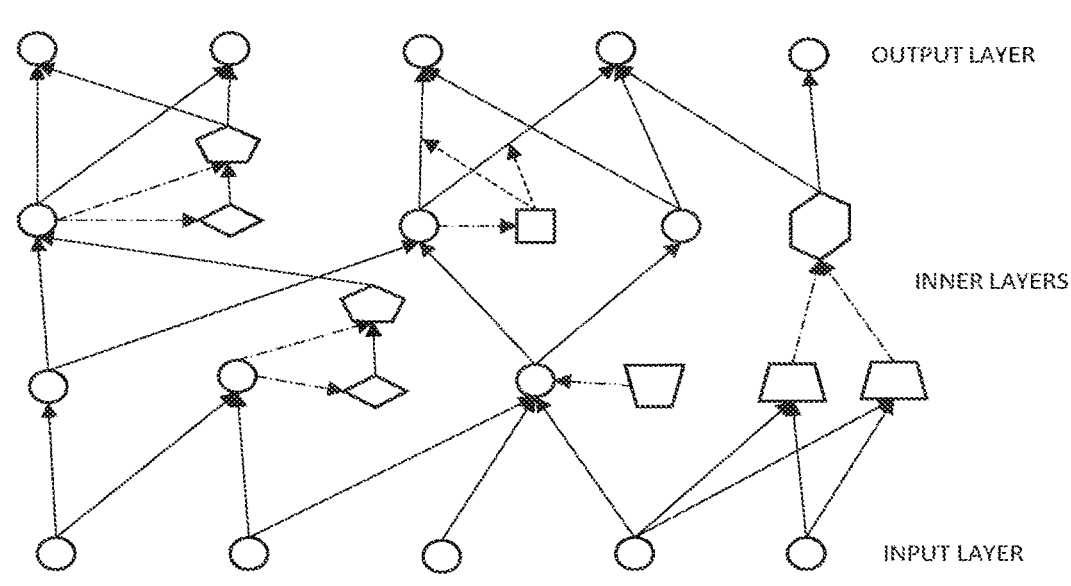
FIG. 11 is a diagram of a small, illustrative example of a mixed-node neural network of the type that might be used in embodiments of various aspects of the invention.

In training a single or multi-layer deep neural network, the feed forward computation comprises the computer system 1000 successively, layer-by-layer, computing the activation of each given node, where the activation is typically a non-linear function applied to the weighted sum of the values received from each of the lower-layer nodes that are connected to the given node by directed arcs. This feed forward computation proceeds until the activation values for all the nodes, including the output nodes, have been computed. In the embodiment shown in FIG. 1, the feed forward computation proceeds in a similar fashion, but the backwards computation is different. In FIG. 1, the input and output nodes of the network are not explicitly shown, and it can be assumed for the purposes of this discussion that the node 101 is a node in an output layer or a node between the input and output layers of the network. An example of a more complete network diagram with input, output and inner layer is shown in FIG. 11.

The embodiment illustrated in FIG. 1 comprises three types of nodes. First, the node 101 is a standard node with its output (e.g., activation value) the result of applying an activation function F(z) to the weighted sum of the outputs of nodes that are connected to node 101 by directed arcs plus a bias term, i.e.:

$$\mathrm{act}_{101}F(z), z = \sum\nolimits_{i=1}^{n} w_i \mathrm{act}_i + w_0,$$

where $w_0$ is the bias term, $w_i$ is the weight for the directed arcs connected to node 101, and $\mathrm{act}_i$ is the activation value of the nodes with directed arcs connected to node 101. Typical choices for the activation function F(z) include the logistic function (also called the sigmoid function): $F(z)=\sigma(Z)=e^z/(e^z+e^{-z})$, the hyperbolic tangent function: $F(z)=\tanh(z)=(e^z-e^{-z})/(e^z+e^{-z})$, and the rectified linear unit: $F(z)=\mathrm{ReLU}(z)=\{z$ if $z>0$, $0$ if $z\leq 0\}$. Other less commonly used activation functions include the exponential rectified linear unit (ELU): $F(z)=\mathrm{ELU}(z)=\{z$ if $z>0$, $\alpha(e^{-z}-1)$ if $z\leq 0$, the leaky rectified linear unit: $F(z)=\{z$ if $z>0$, $-\alpha z$ if $z\leq 0\}$, and the bounded ReLU: $F(z)=\{z$ if $0<z<\beta$, $\beta$ if $z\geq\beta$, $0$ if $z\leq 0\}$. The bounded ReLU can also be considered as a piecewise linear approximation to a logistic function. Other activation functions could also be used with the present invention, including activation functions that may be avoided or denigrated in prior art deep neural networks, such as the perceptron function: $F(z)=\{1$, if $z>0$, $0$, if $z\leq 0\}$ and the linear activation function: $F(z)=\alpha z$.

A second type of node in FIG. 1 is node 102, which is a node with a specialized task. Its direct task is to judge whether node 101 has the correct activation for the datum currently presented to the network.

The third type of node in FIG. 1 is node 103, which combines the results of nodes 101 and 102 and is unusual in several respects. Its parameters may be specified without gradient descent training and in some embodiments its parameters are not updated during training. In addition, it does not follow the normal formula for back propagating partial derivatives of the error function based on the chain rule of calculus. Instead, it selectively blocks the back propagation to node 101, in spite of receiving input activation from node 101. As such, the node 103 is sometimes referred to herein below as a "combining node." For example, in various embodiments, the back-propagation blocking by the combining node 1043 causes a back propagation value that is different from the value that would be used/computed by the chain rule of calculus.

In standard training of a neural network, for each datum of training data, there is a target value for one or more output nodes. In the training of the network, the computer system 1000 further performs a computation that proceeds backwards from one or more output nodes in the opposite direction of each of the directed arcs.

For example, a standard practice in prior art training of a neural network, well-known to those skilled in the art of training neural networks, is to compute, for each datum of training data, the value of an error function based on the difference between the observed values at the output nodes and the target values. The objective to be minimized is the sum of this error function summed over a specified batch of training data. For an individual training datum, in conventional prior art training of a neural network, the computer system 1000 applies the chain rule of calculus to compute the partial derivatives of the error function for this datum with respect to the activation values of the nodes, the biases of the nodes and the weights of the connecting arcs. The learned parameters, which are updated after the iterative computations are performed for all training data items in the set of training data items, typically comprise the weights of the connecting arcs and the bias values as input to the activation functions of the nodes. The computation of partial derivatives proceeds backward through the network.

The method of training the network of FIG. 1 according to various embodiments of the present invention comprises three general steps. First, for a single iteration, the computer system 1000 performs a forward computation layer-by-layer through the network, with the forward computation comprising the well-known technique of computing the activation of a node as a non-linear activation function of the weighted sum of inputs received along directed arcs from a set of source nodes plus a bias, and optionally comprising adding values received from other machine learning systems as terms in the weighted sum of input to the activation function. Second, the computer system performs the well-known backward computation of estimated partial derivatives of the error function of an objective based on the chain rule of calculus. Third, as part of the computer system's performance of the backward computation in the second step, the computer system also performs a backward computation of estimated partial derivatives of the error function of an objective based on a computation that violates the chain rule of calculus by selectively blocking the back propagation. This process can be repeated for numerous, including all, iterations.

The well-known backward training process comprises the computer system 1000 accumulating the partial derivatives of the error function with respect to the learned parameters summed over a minibatch of training data as an estimate of the gradient of the error function. The well-known training process comprises an iterative process of updating the learned parameters by changing the values of the learned parameters by a small change in the negative direction of the estimated gradient. This process is a variation of the well-known optimization technique of gradient descent, called stochastic gradient descent, because the gradient estimated on each minibatch is a noisy version of the true gradient of the error function.

An embodiment of the backward computation that violates the chain rule of calculus is illustrated in FIG. 1 by the dash-dot connections from node 101 to nodes 102 and 103 respectively and the controls 106 and 107.

For the purpose of discussion, without restricting the scope of the invention, assume that node 101, objective 104 and the additional nodes and connections 105 of the network comprise elements of a conventional neural network for which the computer system has already performed some amount of iterative training (e.g., "preliminary training") of the network based on stochastic gradient descent, as summarized above. Suppose now that nodes 102 and 103 are added to the network (which comprises the node 101 along with other nodes and connections 105). Note that control 106 and control 107 are not nodes in the network but rather they represent control that is applied by the computer system to modify the backward computation as described below to effectuate the selective back propagation.

In the embodiment illustrated in FIG. 1, it is assumed that node 101 has a known objective or target value 104 for each training datum. For example, node 101 may be an output node in a conventional layered deep neural network, or node 101 may be an inner layer node. The inner layer node may or may not be directly connected to an output node of the network. Methods for determining a target value for node 101 if it is not directly connected to an output node will be discussed in association with FIG. 4.

The node 102 is a datum-specific performance prediction node 102. The task of node 102 is to discriminate data on which node 101 makes an error from data on which node 101 has the correct output (e.g., activation value). As such, the datum-specific performance prediction node 102 is sometimes referred to herein as an "error judgment node" in order to distinguish it from a "performance judgment node," as discussed in connection with FIG. 6. Error judgment node 102 provides the self-assessment or introspection that is lacking in most conventional neural networks. However, the error judgment node 102 cannot be treated like a normal prior art node. In particular, it cannot merely be trained by conventional back propagation and gradient descent.

Consider combining node 103, which combines the results of node 101 and error judgment node 102. To understand the requirements on the activation function of the combining node 103, suppose for the moment that node 101 and node 102 each approximate a logic function, with an activation of 0 for "false" and 1 for "true." Node 102 has a value of 1 ("true") if it believes that node 101 is correct and a value of 0 ("false") if node 102 believes that node 101 is wrong. Obviously, if both node 101 and node 102 have value 1, then they agree and the combining node 103 should also have the value 1 ("true") as the node 101. Similarly, if node 101 believes "false" and node 102 says "true," then again the error judgment node 102 is agreeing that node 101 is correct and node 103 should also have the same value 0 ("false") as node 101.

However, if node 102 has the value 0 ("false"), it is disagreeing with node 101. For error judgment node 102 to have any impact, the activation value of the combining node 103 must be different from that of node 101 in this case.

If the computation of the activation of combining node 103 treats the output (e.g., activation value) of the error judgment node 102 as if it is always correct, then, when the activation of error judgment node 102 is 0 ("false"), the activation of the combining node 103 should reverse the activation of node 101. That is, if both node 101 and node 102 are 0 ("false"), the combining node 103 should be 1 ("true") (that is, the opposite of node 101). If node 101 is 1 ("true"), and node 102 is 0 ("false") then the activation of node 103 should be 0 ("false") (again, the opposite of node 101). Thus, in this example with Boolean inputs, the activation function of combining node 103 is the exclusive NOR function.

For specifying an activation function of the combining node 103 based on the above example, the simplest rule, and a preferred embodiment of the system illustrated in FIG. 1, is for the activation of the combining node 103 to combine the outputs of nodes 101 and 102 as if the error judgment node 102 is always correct in its judgment. Although somewhat counter intuitive, an activation function with this property is preferred in many embodiments. Any activation function that back propagates to the error judgment node 102 an error function of the objective that the output (e.g., activation value) of the combining node 103 match the target will serve, so an activation function with the property described above will work fine. Some embodiments may use a different activation function, but without loss of generality, the discussion will be limited to variations of the preferred embodiment described above unless otherwise noted. Having a simple characterization of the operation of the combining node 103, such as "treat the output received from the error judgment node 102 as if it is always correct" in the preferred embodiment facilitates interpretability.

Notice that the objective passed to the error judgment node 102 by the computer system during back propagation is not for the output of the error judgment node 102 to match the target, but rather the objective passed to the error judgment node 102 is for the output (e.g., activation value) of the combining node 103 to match the target. If the task of the error judgment node 102 was to make its own output match the target, that would be the same as the task of node 101 and, therefore equally difficult. In addition, two high-performance nodes with the same objective will tend to both be right most of the time, so their outputs will tend to be highly correlated. That correlation makes it difficult to train a combining node to make a significant improvement over the best individual subsystem. In contrast, in the preferred embodiment, the task of the error judgment node 102 is much easier than the task of the node 101 and so is the task of the combining node 103.

Of course, usually, it will not be possible to train nodes 102 and 103 to achieve their shared objective on every training datum even though the preferred embodiment for the activation of the combining node 103 treats the output of the error judgment node 102 as if it is always correct. Note, however that the task of the error judgment node 102 is very different from the task of node 101. This difference creates a very strong built-in diversity between the training and decision boundaries learned by the error judgment node 102 from those of node 101. This diversity facilitates the task of the combining node 103 and generally makes the task of the error judgment node 102 much easier than the task of node 101. The task for the combining node 103 and therefore for the error judgment node 102 is easier than the task for 101 because the combining node 103 receives the output of node 101, so it is trivial for the combining node 103 to be trained to match the performance of node 101 which may make it easy for the combining node 103 to be trained to make an incremental improvement. Since this objective is passed back to the error judgment node 102, it is also often easy to train the error judgment node 102 to cause the output of the combining node 103 to be an incremental improvement over the output of node 101.

Figure 2:
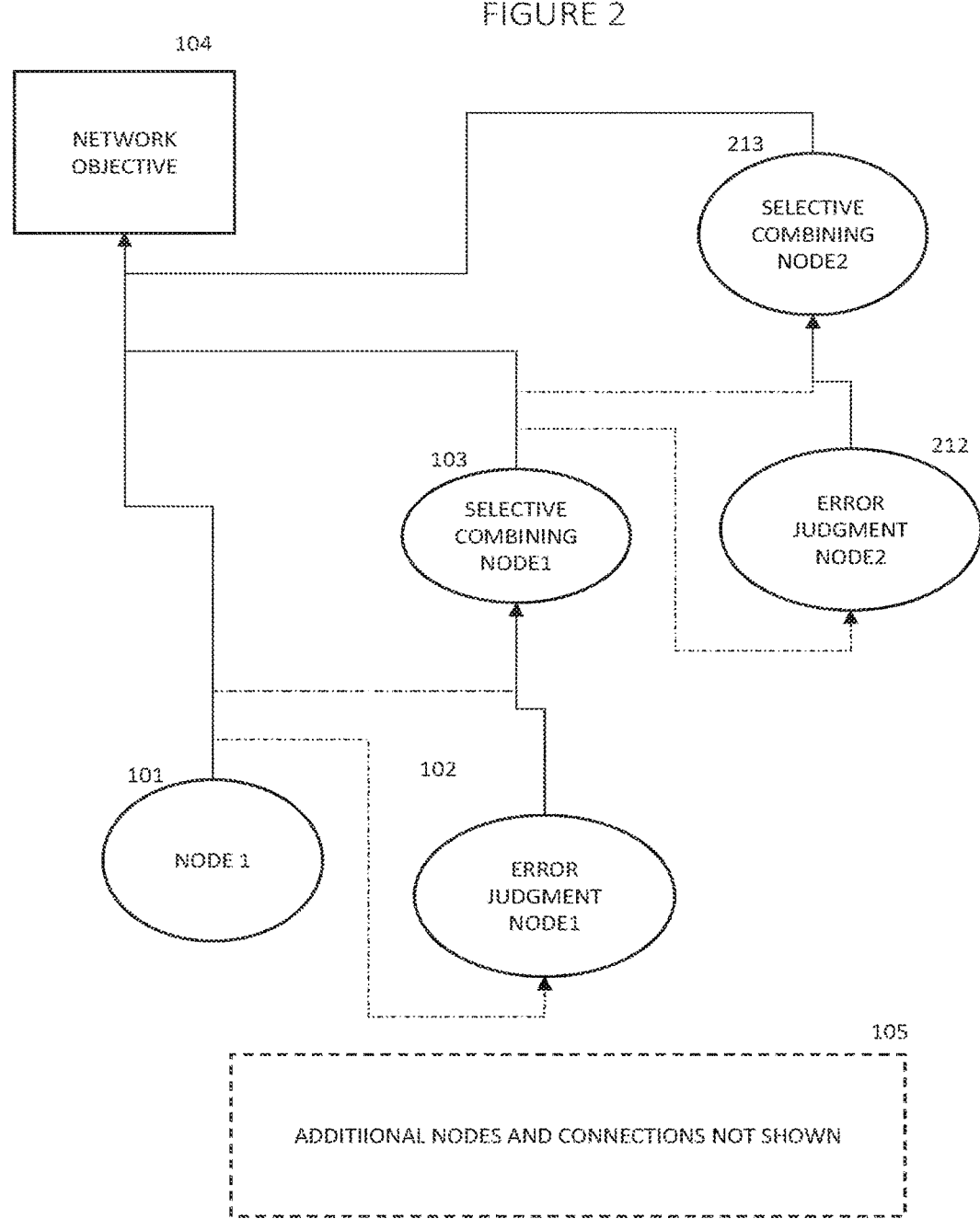
FIG. 2 is a diagram of an illustrative embodiment of an aspect of the invention comprising a plurality of datum-specific performance prediction nodes.

Furthermore, FIG. 2 shows an embodiment for correcting the network when the error judgment node 102 is wrong by cascading a second error judgment node 212. In the embodiment of FIG. 2, it is sufficient for the first error judgment node 102 and each error judgment node in the cascade (e.g., the second error judgment node 212) to make an incremental improvement, no matter how small. Some embodiments use small, simple subsystems for node 101 and/or for error judgment node 102 to achieve faster training, more robustness or other desirable attributes. A cascade of error judgment nodes with associated combining nodes 103, 213 with selective back propagation can be built to achieve a final error rate as low as feasible for any network, so the design and training of individual elements in the cascade may trade off the goal of immediately trying for the lowest possible error rate for other desirable attributes. Embodiments of various example strategies for building a network will be discussed in association with FIG. 9.

Referring back to FIG. 1, it remains to define the activation function of the combining node 103 for all values in the range of its inputs. If the activations of nodes 101 and 102 are continuous valued in the range [0, 1], for example if they both have a logistic or sigmoid activation function, then either of the following continuous functions would satisfy the specified conditions for the activation function of the combining node 103 at the extreme values of the range:

$$\mathrm{act}_{103}(\mathrm{act}_{101}, \mathrm{act}_{102}) = 1 - |\mathrm{act}_{101} - \mathrm{act}_{102}|$$

$$\mathrm{act}_{103}(\mathrm{act}_{101}, \mathrm{act}_{102}) = \mathrm{act}_{101} * \mathrm{act}_{102} + (1 - \mathrm{act}_{101}) * (1 - \mathrm{act}_{102})$$

The first expression can also be written in the form of an activation function of a single-variable function applied to the weighted sum of the inputs plus a bias that happens to be 0:

$$\mathrm{act}_{103} = F(z) = 1 - |z|, \text{ where}$$

$$z = \sum_{i=101}^{102} w_i \mathrm{act}_i + w_0, \, w_{101} = 1, \, w_{102} = -1, \, w_0 = 0.$$

If nodes 101 and 102 are continuous valued in the range [−1, 1], for example the tanh( ) function, the activation of the combining node 103 may take the simpler form of:

$$\mathrm{act}_{103}(\mathrm{act}_{101}, \mathrm{act}_{102}) = \mathrm{act}_{101} * \mathrm{act}_{102}$$

Whatever the activation function of the combining node 103, it must receive an input from node 101, but for several reasons, it should not simply back propagate to node 101 the partial derivative of the error function as in normal back propagation. One reason is the well-known observer effect: "The act of observing may affect the thing being observed." More specifically, back propagation from the combining node 103 to the node 101 would cause the weights on the incoming connections to node 101 to be updated and changed, which will change the behavior that the computer system is training the error judgment node 102 to judge. Back propagation from the combining node 103 to node 101 would make it more difficult for the error judgment node 102 to be trained to predict the performance of node 101. It would then be more difficult for the error judgment node 102 to be trained to correct errors made by node 101 by way of the combining node 103. This might not be an insurmountable problem, but embodiments of the invention avoid this problem entirely.

Another reason for not back propagating the partial derivative of the error function from the combining node 103 to node 101 is that, if the back propagation from the combining node 103 to node 101 is blocked, the error judgment node 102 may be trained on development data 114 that has been set aside and is disjoint from the training data 113 that is used in training node 101. In some embodiments, the error judgment node 102 is trained on both the training data 113 and the development data 114, while node 101 is trained only on the training data 113. When trained on the development data, the error judgment node 102 can be trained by the computer system to learn an unbiased estimate of the performance that node 101 will have on new data. Thus, the computer system may train the error judgment node 102 to correct errors caused by node 101 overfitting its training data as well as correcting errors on the training data. Preferably, an embodiment that makes use of this capability also sets aside additional development data that is not used in training the error judgment node 102 and, therefore, can be used in development testing of the error judgment node 102. The intervention in the back propagation from the combining node 103 to node 101 is represented by control 106 in FIG. 1.

In some embodiments, the back propagation from the combining node 103 to node 101 is not completely blocked but is merely modified or is only blocked part of the time. In the embodiment illustrated in FIG. 1, complete blockage is preferred. In some embodiments considerations other than those discussed here may make partial blockage the preferred choice. Although it will not be mentioned each time, any selective back propagation may, in some embodiments, be a partial blockage rather than a complete blockage. The advantages of a complete blockage that are discussed here also occur to a lesser degree in embodiments with partial blockage. In some embodiments, the other considerations may outweigh the reduction of the benefit from complete blockage.

Figure 4:
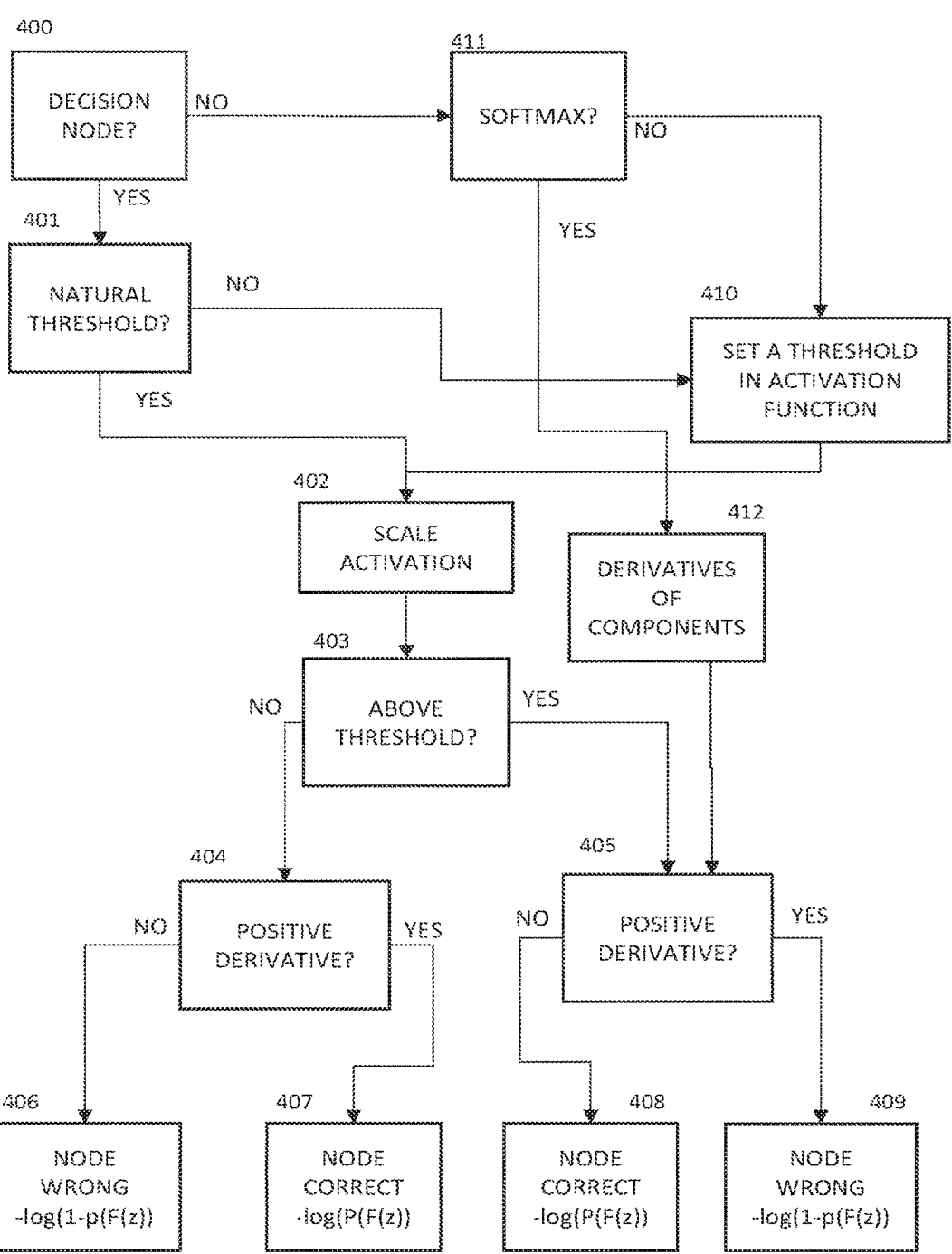
FIG. 4 is a flowchart of an illustrative embodiment of an aspect of the invention that expands the scope of the embodiments illustrated in FIGS. 1, 2 and 3.

Error judgment node 102 may be trained by the computer system to use the activation of node 101 as part of the information it uses to predict the performance of node 101, as shown by the dot-dash connection from node 101 to node 102, by way of control 107, in FIG. 1. This connection also should not be used for back propagation from the error judgment node 102 to node 101, for reasons similar to those given above for the connection from node 101 to the combining node 103. Control 107 prevents node 101 from receiving back propagation from the error judgment node 102, which would otherwise have the same disadvantages as receiving back propagation from the combining node 103. In FIG. 1, the node to be judged, node 101, is directly connected to a network objective 104 (that is, during training of the learned parameters associated with node 101, at least one objective is to minimize the error cost function of objective 104), either as an output node or as an inner layer node with connections that skip the intervening layers. However, there is no requirement that objective 104 be the only objective of the network. FIG. 4 is an illustration of an embodiment of an aspect of the invention that enables an objective to be computed for an inner layer node for any training datum.

Figure 6:
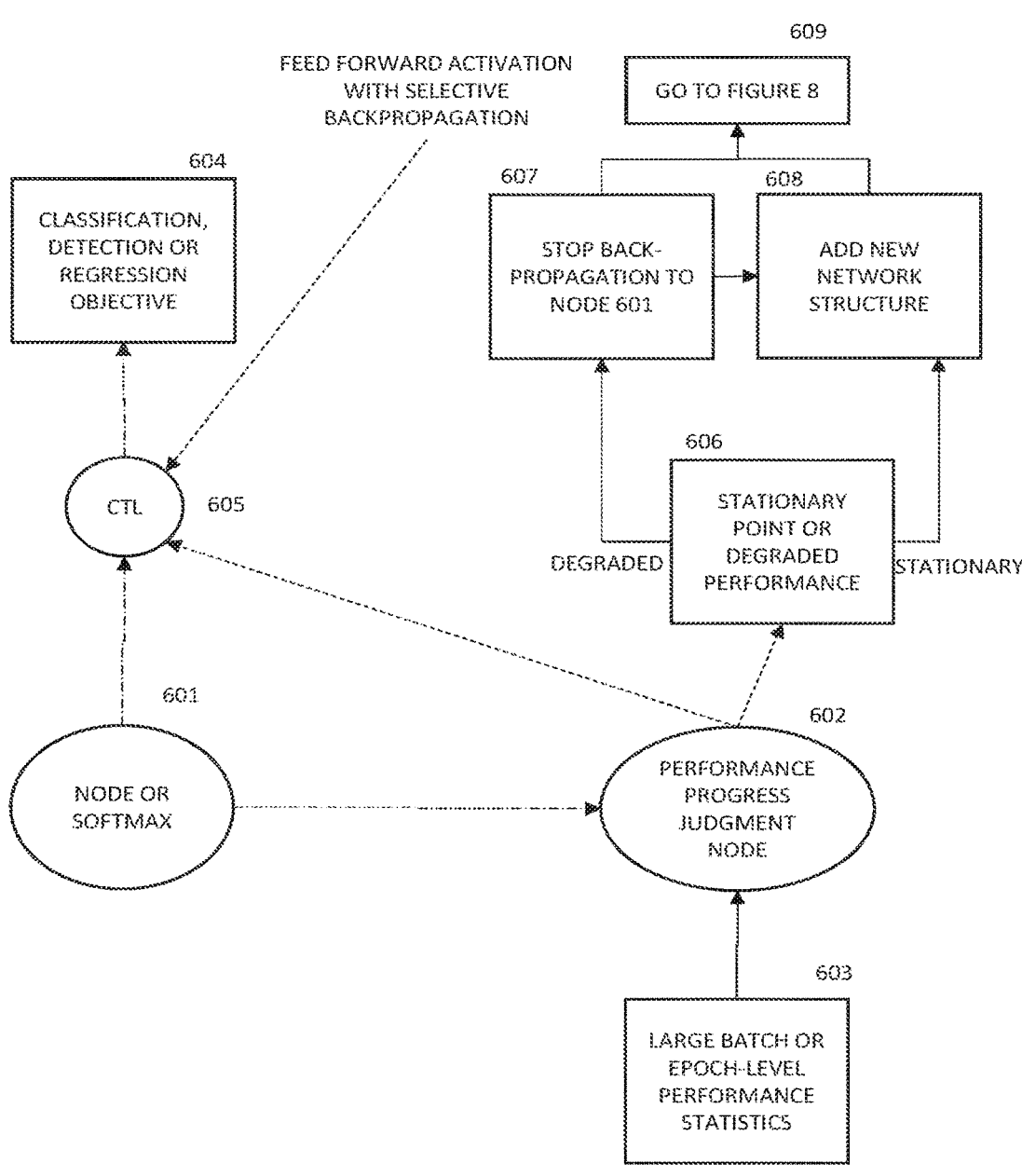
FIG. 6 is an illustrative embodiment of an aspect of the invention comprising a performance progress judgment node.

The presence of the error judgment node 102 enables an implicit delegation of responsibility that allows the design of the subsystem of node 101 to be simpler than it would otherwise be. This implicit delegation of responsibility also allows the training of the subsystem of node 101 to be restricted or to have greater regularization imposed. These possibilities then enable useful trade-offs, such as allowing more errors by node 101 to make the training of the subsystem faster, or to make the subsystem of node 101 more robust against random disturbances or deliberate adversarial attacks. The subsystem of node 101 can also be designed to be easier to interpret. In addition, a simpler design, more regularization and/or slowing or stopping the training early will make it less likely for node 101 and its subsystem to overfit the training data. An embodiment that enables measuring the performance progress of the training of node 101 and its subsystem and providing node-specific early stopping if necessary is illustrated in FIG. 6. The implicit delegation of responsibility for fixing errors is extended and enhanced by having a plurality of error judgment nodes, as in the embodiments illustrated by FIGS. 2 and 3.

FIG. 2 illustrates an embodiment that is similar to that shown in FIG. 1, with an extra (second) error judgment node 212 and an extra (second) combining node 213. The second error judgment node 212 predicts the performance of the combining node 103 on the network objective 104 in the same way that the error judgment node 102 predicts the performance of node 101. The second combining node 213 combines the activations of nodes 103 and 212 the same way that node 103 combines the activations of nodes 101 and 102.

Notice that the combining nodes 103 and 213 do not require connection weights to be trained by gradient descent. Their connections and activation function may be predetermined by the role that they play.

In many embodiments, the error judgment nodes 102 and 212 are also very easy to train. For example, if node 101 is an output node of a deep neural network classifier, its connecting nodes (i.e., the nodes with directed arcs to nodes 101) are likely to represent very sophisticated features that have already been computed by many lower layers. In that case, node 102 may only need to have connections to that same set of feature nodes, and the same may apply to the second error judgment node 212. As an incremental addition to a network that has already been trained as part of a preliminary iterative network training in such an embodiment, the error judgment nodes 102 and 212 may be trained as single-layer nodes between the nodes directly connected to them temporarily frozen and treated as their input and output.

Alternately, node 101 and/or node 103 may have very high performance, making mistakes on only a small fraction of the data. In that case, the corresponding error judgment node 102/212 may be able to characterize the mistakes as a simple one-level discriminator directly connected to the input data. Similar favorable situations occur if node 101 is in an intermediate layer of the network that has a well-defined intermediate objective with labeled training data.

In any of these cases, the added error judgment nodes 102 and 212 may be trained independently of the rest of the network and mostly independently of other error judgment and combining nodes added at the same time. In contrast, incrementally adding additional conventional nodes to an already well-trained network trained by gradient descent disturbs the stationary point that has already been found by iterative training. Such an addition often requires extensive retraining. In fact, a common practice is to retrain a network from scratch after adding an additional layer.

In some embodiments, for example blocks 922, 923 and 924 of FIG. 9, discussed further below, one or more pairs of error judgment and combining nodes with selective back propagation are added at the same time to an existing well-trained network (e.g., a network that is trained in a preliminary training stage to or near convergence). The added error judgment nodes may be trained on their respective judgment tasks with the rest of the network fixed. Even simple one-layer error judgment nodes will find some errors to correct, unless the network is already at optimum performance, which the error judgment nodes will be able to verify on the development data. After this relatively quick fix-up training, the performance optionally may be fine-tuned by further gradient descent training of the full network while enforcing the selective-back-propagation controls from the error judgment and combining nodes.

Figure 3:
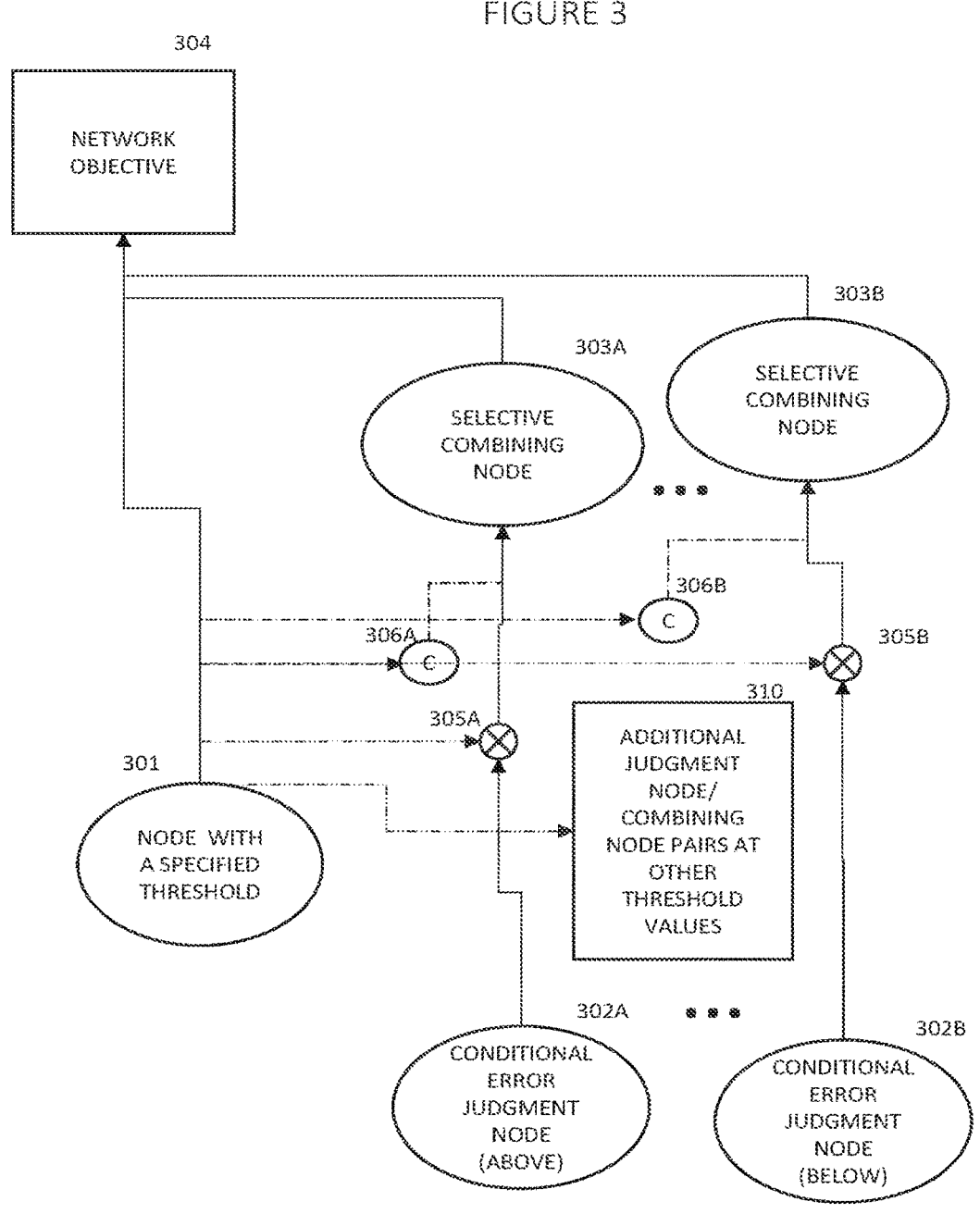
FIG. 3 illustrates an embodiment of another aspect of the invention comprising a plurality of datum-specific performance prediction nodes.

FIG. 3 illustrates an embodiment of another aspect of the invention. Node 301 is similar to node 101 of FIG. 1 with the addition of a specified threshold value for its activation function. This threshold value may be a hyperparameter set by the system designer. In some embodiments, the threshold is set to a value at which the derivative of the activation function is at its maximum or is discontinuous with a positive step. For example, it may be set at the value 0.5 for the logistic function, or at the value 0 for the tanh( ) function, or at the value 0 for the ReLu( ) function. However, in some embodiments any other threshold value may be chosen instead.

Node 302A and node 302B are error judgment nodes like node 102 in FIG. 1, except node 302A is only active for data for which the activation of node 301 is above the specified threshold, and node 302B is only active for data for which the activation of node 301 is below the specified threshold. Because the error judgment that each of these nodes makes is conditional on the data being evaluated being above or below the specified threshold, each of these nodes is sometimes referred to herein as a "conditional judgment node," or more specifically, a "conditional error judgment node." The connections from node 301 to the combining nodes 303A and 303B, respectively, drawn with alternating dots and dashes in FIG. 3, are the same as the connection from node 101 to the combining node 103 in FIG. 1. That is, each of these connections indicates a feed forward connection with a modified or non-existent back propagation. The controls 306A and 306B are like the control 106 in FIG. 1. They are specified by hyperparameters and are controls rather than network nodes. Some embodiments also comprise connections from node 301 to conditional error judgment nodes 302A and 302B, with controls like control 107 in FIG. 1. To simplify the diagram, these connections are not shown in FIG. 3.

The embodiment illustrated in FIG. 3 further comprises a new kind of control, illustrated by controls 305A and 305B. The lines between node 301 and controls 305A and 305B do not represent either feed forward activation or back propagation. Control 305A is a 0-1 logic control gate that transmits the activation from the conditional error judgment node 302A to the combining node 303A and the return back propagation if and only if the activation of node 301 is above the specified threshold. Control 305B is a 0-1 logic control gate that transmits the activation from the conditional error judgment node 302B to the combining node 303B and the return back propagation if and only if the activation of node 301 is above the specified threshold. Various embodiments may independently specify whether control 306A and/or control 306B is to transmit or block activations that exactly equal the threshold value. Other embodiments may allow overlap or leakage, transmitting a fraction of the activations that would normally be blocked and/or blocking a fraction of the activations that would normally not be blocked.

Thus, if node 301 is viewed as a detector, conditional error judgment node 302A is trained to discriminate between correct detection and false positives (since the conditional error judgment 302A is for activations above the threshold), whereas the conditional error judgment node 302B is trained to discriminate between true negatives and false negatives (since the conditional error judgment 302B is for activations below the threshold). The embodiment illustrated in FIG. 3 is preferred over the embodiment illustrated in FIG. 1 in a design in which the discrimination between true and false positives is intended to be independent of the discrimination between true and false negatives.

As indicated by block 310, the embodiment illustrated in FIG. 3 may be generalized beyond the concept of a single threshold with two conditional judgment nodes, one for data above the threshold and one for data below the threshold. In some embodiments, there is a plurality of thresholds with an additional conditional judgment node and associated selective combining node for each inter-threshold interval. In some embodiments, a plurality of thresholds is used to replace node 301 with a cascade of nodes with monotonically increasing biases arranged to simulate a node with multiple thresholds. In such embodiments, each node in the cascade has one or two conditional judgment nodes and the associated selective combining nodes. In either of the embodiments with a plurality of thresholds, the threshold values may be determined, for example, by the mega-batch-based data sort performed by the computer system in block 811 of FIG. 8, described further below.

In the discussion of the embodiments illustrated by FIGS. 1, 2 and 3, it was assumed that during training there is a known objective for the node to be judged, that is, node 101 has objective 104 in FIGS. 1 and 2, or node 301 has objective 304 in FIG. 3. FIG. 4 expands the scope of the embodiments illustrated in FIGS. 1, 2 and 3 by eliminating the requirement that node 101 or 301 be directly connected to output nodes with known labels.

The above descriptions for FIGS. 1-3 described adding the combining node (or nodes) 103, 303 and the error judgment nodes 102, 302 for a single "normal" node 101, 301 of the network. In various embodiments of the present invention, the combining and error judgment nodes can be added for multiple nodes of the network, rather than merely a single node.

FIG. 4 is a flowchart of an embodiment of a method for determining a local objective for an inner layer node for the purpose of enabling the training of an error judgment node of the performance of the inner layer node relative to that objective. The inner layer node-specific objective determined by the embodiment illustrated in FIG. 4 is also useful for other purposes.

In step 400, the computer system determines whether the node being analyzed is to be treated as a decision node. For the purpose of the embodiment illustrated in FIG. 4, any node with a monotonic activation function whose value can be compared to a threshold value may be treated as a decision node. If the computer system determines that the node is to be treated as a decision node, the computer system proceeds to step 401.

In step 401, the computer system determines whether the activation function has a natural threshold and if so whether that threshold should be used in the embodiment of FIG. 4 or if the threshold should be determined by other means. For any activation function with a unique inflection point at which the derivative has a maximum value, such as the logistic function or the hyperbolic tangent, a natural choice for such a threshold value is the inflection point. These activation functions are motivated by the analogy with a biological neuron in which the "decision" for the neuron to fire is based on whether the accumulated electrical potential exceeds a threshold. In keeping with this analogy, these activation functions are also bounded, with a maximum activation value. For a node with such an activation function the extreme values may be regarded as two alternatives with the activation value of the node relative to the threshold representing a "decision" in favor of one of the alternatives. For functions with a single discontinuity in the derivative, such as the ReLU function, the point of discontinuity is one natural choice for a threshold value. However, with a linear portion with a constant derivative, other choices of a threshold value are also reasonable. In fact, embodiments of the present invention allow any choice of threshold value for any activation function, as will be discussed further in association with step 410. If there is no natural threshold or if the computer system determines not to use the natural threshold, the computer system proceeds to step 410.

If the node being analyzed is to be treated as a decision node with a natural threshold, then the computer system proceeds to step 402. In step 402, the computer system maps the activation value $F(z)$ for the node to a pseudo-probability $P(F(z))$ in the interval $[\epsilon, 1\text{-}\epsilon]$, where $\epsilon$ is a small positive number used to prevent the logarithm to be computed in step 406, 407, 408, or 409 from overflowing. This mapping to a pseudo-probability is monotonically increasing and does not affect the comparisons to be done in steps 403, 404 and 405. The pseudo-probability value will be used in the error function for the local, node-specific objective. The mapping function may include hyperparameters that can be tuned to optimize system performance. For the logistic function, no mapping is necessary. For other bounded functions, such the hyperbolic tangent, and the bounded ReLU, the mapping function may be a linear affine function mapping the range of the activation function to the interval $[\epsilon, 1\text{-}\epsilon]$. Since the scaling in step 402 does not affect the comparisons to be done in steps 403, 404 and 405, in some embodiments, step 402 may be postponed to be done after whichever of step 406, step 407, step 408, or step 409 is done for the current datum.

After step 402, the computer system proceeds to step 403. In step 403, the computer system compares the activation value for the node for the current datum to the decision threshold from step 401 or the threshold determined in step 410, discussed below. If the activation value is above the threshold, the computer system proceeds to step 405. If the activation value is below the threshold, the computer system proceeds to step 404. If the activation value is exactly equal to the threshold, it essentially does not matter whether the computer system proceeds to step 404 or step 405. Various embodiments may choose either way.

In step 404 and in step 405, the computer system determines the sign of the derivative of the specified objective with respect to the activation function of the node being analyzed, as computed from the feed forward network activation and the chain-rule-based back propagation of partial derivatives. Note that the use of the back propagated derivative in determining the node-specific objective means that the back-propagation computation must back propagate to the node being analyzed before computing the objective and back propagation from an associated conditional error judgment node. This situation would create an infinite recursion if during computation of the back propagation, there was a directed connection from the node being analyzed to its associated conditional error judgment node, except, as explained in association with FIGS. 1, 2 and 3, such back propagation from an error judgment node to the node being judged is blocked. This issue is another reason, in addition to the observer effect, for blocking this back propagation. This issue only arises in the training of the conditional error judgment node, and there is no problem in computing the feed forward activations of the conditional error judgment node and the node being judged.

After the computer system determines the sign of the derivative in either step 404 or step 405, the computer system proceeds to step 406, 407, 408, or 409. In each of these steps, the computer system evaluates of the activation of the node as being correct or wrong relative to the threshold and the sign of the back propagated partial derivative of the network objective error function. If both the activation is below threshold and the partial derivative is negative, the node is considered by the computer system in step 406 to be wrong on the current datum. Similarly, if the activation of the node is greater than the threshold and the partial derivative is positive, the computer system considers the node activation to be wrong in step 409. However, the computer system considers the node activation to be correct if either the activation is below threshold with a positive partial derivative (step 407) or the activation is above threshold with a negative partial derivative (step 408).

Stated in more intuitive terms, the computer system considers the activation to be correct or wrong on the current datum based on whether a gradient descent update based on the one-example estimate of the partial derivative would push the activation value toward or away from the threshold. To follow the logic, recall that the error function is to be minimized so a gradient descent update would be in the opposite direction from the sign of the partial derivative. Therefore, a negative partial derivative corresponds to an update that would increase the value the activation. Thus, in the case of an activation below threshold (step 403 proceeding to step 404) with a negative partial derivative (step 404 proceeding to step 406), the update would be trying to increase the activation, which would be in the direction of trying change the activation from below threshold to above the threshold. In this case, in the embodiment illustrated in FIG. 4, the computer system considers the node activation to be wrong on the current datum. Similar reasoning applies to the interpretation of each of the other end conditions, i.e., blocks 407, 408 and 409.

Returning to step 401, if the computer system determines that the node being analyzed is not to be treated as a decision node, the computer system proceeds to step 411. In step 411, the computer system determines whether the node being analyzed is to be treated as a node within a softmax set. The softmax operation computes the activations of a set of nodes such that the activations are all non-negative and sum to 1. The softmax operation is well known to those skilled in the art of training neural networks. For example, the set of output nodes in a classification task is typically treated as a softmax set. In a softmax set, each node in the softmax set receives one or more input values from lower level nodes with each input value weighted by the connection weight from the lower level node to the particular node in the softmax set. However, in a softmax set the activation of each node is a combined computation rather than a separate computation for each node. The activation of a node in a softmax set is given by $$F(z_i) = e^{z_i} / \sum_{j=1}^{n} e^{z_j},$$

where $$z_j = \sum_{k=1}^{m} w_k \mathrm{act}_k$$

is the weighted sum of the input to node j. The activations of the nodes in a softmax set are all positive and sum to 1.

If the node being analyzed is not part of a softmax set, then the computer system proceeds to step 410. If the node being analyzed is part of a softmax set, then in step 411 the computer systems determines whether the nodes in the set are to be treated together as a softmax set or separately as individual nodes based on specifications in the system design and hyperparameters. If the nodes are to be treated separately, then the computer proceeds to step 410.

If the softmax set is to be treated together, the computer system proceeds to step 412. In step 412, the computer system computes the partial derivative of the error function with respect to each of the components of the softmax. The softmax operation in effect changes the signs of some of the component partial derivatives based on their relatively lower activation values, which substitutes for the threshold comparison in step 403. After step 412, the computer system proceeds to step 405, whose operation is described above.

In some embodiments of the invention, it is preferable not to treat a set of softmax nodes together as a single softmax structure. For example, for the type of selective back propagation illustrated in FIG. 5, it is necessary to have an identified positive and negative alternative for each detector. One embodiment of a softmax set that has this property is for the computer system to replace each node in the softmax set with a three-node set of nodes like nodes 502, 503 and 504 in FIG. 5.

In step 410, the computer system determines a threshold for any node that is not to be treated as a decision node or as a member of a softmax set. For example, a linear regression node or a node with a piecewise linear activation function may have an entire interval in which the derivative of the activation has its maximum value, so there is no natural single point of inflection. In addition, for any node, the system design may specify that a threshold other than the inflection point be used. For example, for a rectified linear unit or any of its variations, the system design or hyperparameters may specify that the threshold be at some point in the z>0 portion of the activation function. In step 410, the computer system determines a threshold for the node to be analyzed based on specifications in the system design and/or based on hyperparameters. From step 410, the computer system proceeds to step 402, whose operation was described above.

The task of the process illustrated in FIG. 4 is to supply an error function value for an error judgment node associated with the node being analyzed. The error function value depends on the pseudo-probability P(F(z)) computed in step 402 and on whether the node is determined to be correct or wrong on the current datum. In steps 407 and 408, the node is determined to be correct and the computer system sets the error function value to, for example, −log(P(F(z)). In steps 406 and 409, the node is determined to be wrong and the computer system sets the error function value to, for example, −log(1−P(F(Z)).

In some embodiments, the process illustrated in FIG. 4 may be greatly simplified. For example, in the configuration shown in FIG. 1, back propagation from error judgment node 102 and combining node 103 is blocked, so feed forward node 101 receives backpropagation only from its other outgoing connections, whether those outgoing connections are directly to an output or are indirect through some of the other nodes and connections that are not shown. In this configuration, it is possible to determine a target value for node 102 for each training datum just by determining whether node 101 is correct or wrong on that datum, without having defined an error function. In a preferred embodiment, node 101 has an arbitrary monotonically increasing activation function with a threshold value that is specified by a hyperparameter. The hyperparameter may be set by the system designer or may be specified by a learning management (or coach) system. More details about such learning management (or coach) systems are described in WO/2018/0175098A1 and WO/2018/0226492A1, which are both incorporated herein by reference. On a given datum, node 101 is said to be correct if the derivative back propagated to node 101 from the higher nodes of the network is positive and the activation of node 101 is below threshold or if the derivative back propagated from the higher network is negative and the activation of node 101 is below threshold. Otherwise node 101 is said to be incorrect. The target for error judgment node 102 for a datum d is a certain value, say 1, when node 101 is correct on datum d, and a different value, say 0, when node 101 is incorrect on datum d. In this embodiment, combining node 103 may back propagate to 102 as if node 102 were an output node with the target described above. That is, for example, if the activation function of node 102 is a logistic function, node 103 use the cross entropy error function $E=target(d)*log(act_{102}(d))+(1-target)*log(1-act_{102}(d)$. Since target is either 0 or 1, only one term of this expression is non-zero for a given datum d.

Figure 5:
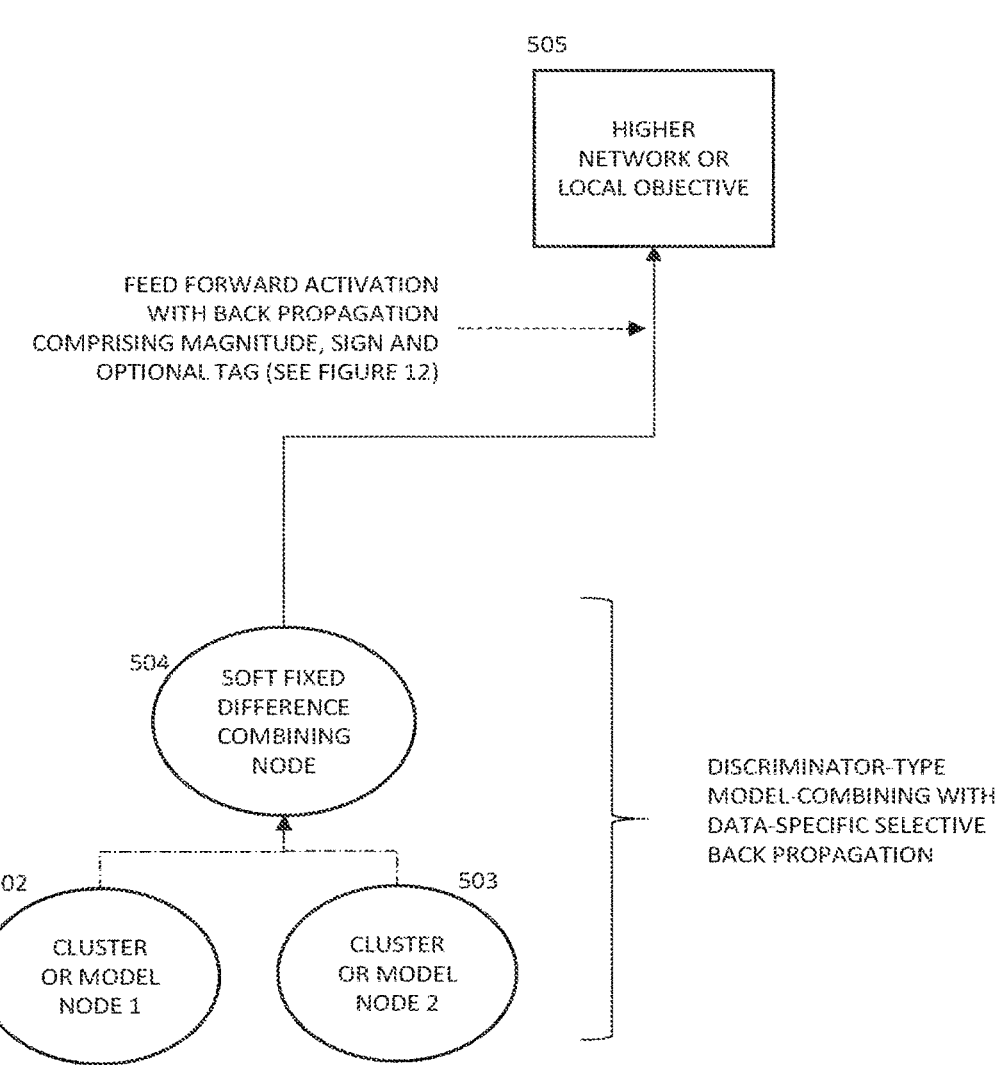
FIG. 5 is a diagram of an illustrative embodiment of another aspect of the invention.
Figure 5A:
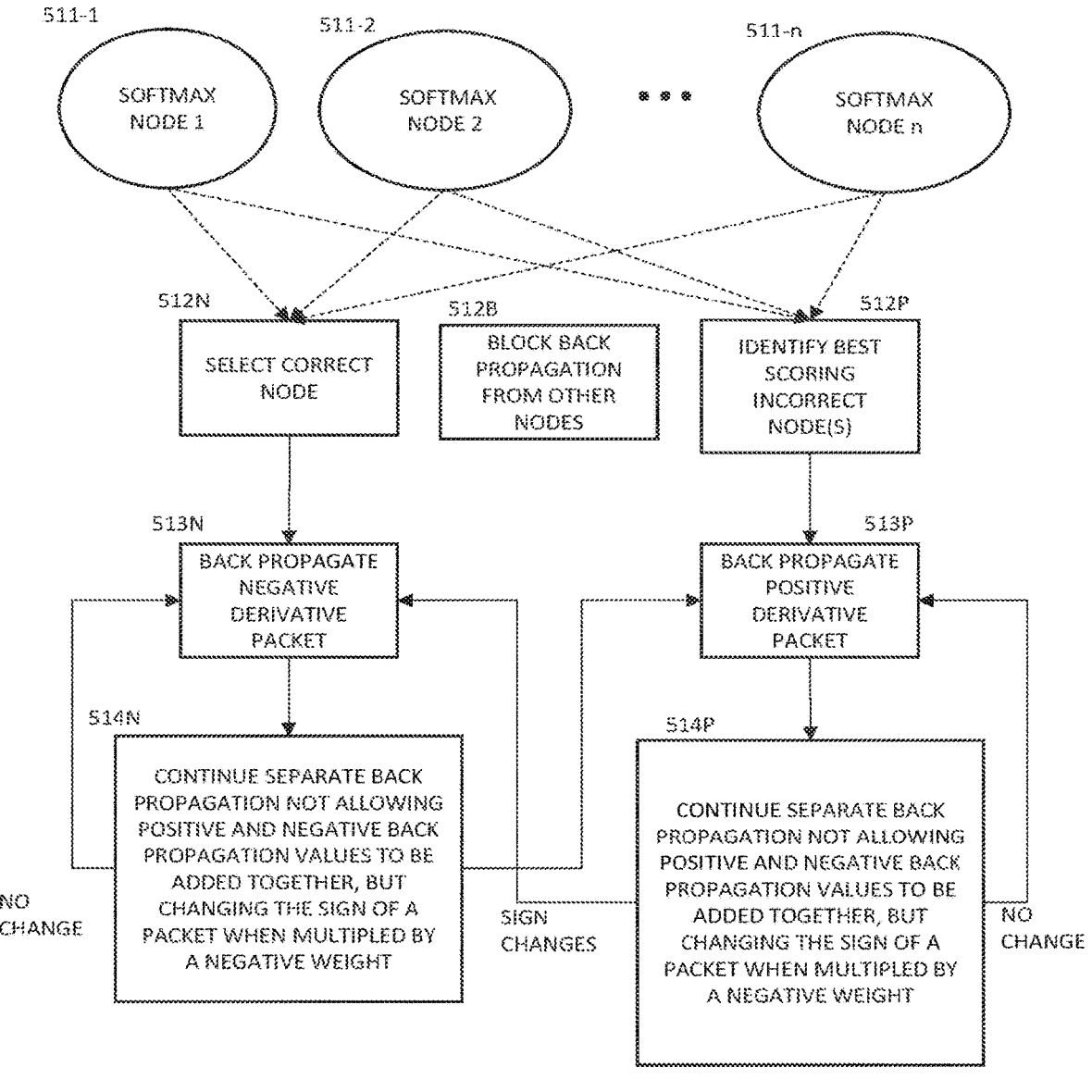
FIG. 5A is a diagram of an illustrative embodiment of a further aspect of the invention related to the aspect of the invention illustrated in FIG. 5.

FIG. 5 illustrates an embodiment of another aspect of the invention, with preparation illustrated in FIG. 5A and an alternate embodiment and generalization illustrated in FIG. 5B. This optional aspect enables a unique type of training that is capable of learning decision boundaries that are more sensible in the sense of being easier to interpret, more robust against both random noise and deliberate adversarial example, and, in some cases, faster to train.

In an illustrative embodiment shown in FIG. 5 the computer system treats rewards and penalties differently from each other during back propagation. More specifically, in the embodiment illustrated in FIG. 5, for a training datum for which the activation of node 504 is to be increased or rewarded, the computer system back propagates the partial derivative to node 502 and blocks the back propagation to node 503. For any datum for which the activation of node 504 is to be decreased or penalized, the computer system back propagates the partial derivation to node 503 with its sign reversed and blocks back propagation to node 502.

In the embodiment illustrated in FIG. 5A, it is assumed the output nodes form a softmax set and the examples of, and counter examples to, the target value for a datum are separate as illustrated in FIG. 5A, which begins the separation of rewards and penalties. In FIG. 5A, the n>1 output nodes are represented by nodes 511-1 through 511-n.

In blocks 512N and 512P, the computer system creates two separate back-propagation packets. In block 512N, the computer system selects the node that corresponds to the correct answer for the current training datum and creates a back-propagation packet. The partial derivative of the error function in this packet will be negative, because increasing the output value of the correct node will decrease the error. A negative partial back propagated to a lower node is a reward because an update in the direction of the negative gradient will increase the activation of the lower node, that is "reward" it.

In block 512P, the computer system selects the best scoring output node that does not correspond to the correct answer. In some embodiments, the computer system selects a plurality of incorrect output nodes with the best scores with the number to be selected controlled by a hyperparameter.

Block 512B blocks back propagation from nodes other than those selected by blocks 512N and 512P.

In blocks 513N, 513P, 514N and 514P, the computer system back propagates the positive and negative derivative packets, respectively, keeping them separate. That is, the computer system avoids adding together a positive derivative value and a negative derivative value. However, whenever a packet is back propagated through a connection with a negative weight, the sign of the packet is reversed, and it will be treated as a packet with its new sign at the addition of derivatives at the source node. This sign reversal is indicated by the arrow connecting block 514N with block 513P and the arrow connecting block 514P with block 513P. If there is no change in sign, the computer system returns to block 513N from block 514N and to block 513P from block 514P.

The loops of 512N-514N and 513P-514P continue in parallel but synchronized so that if one has a sign change coming into a node, their values which then agree in sign can be added together. There will be multiple instances of each type of packet that may be processed in parallel for each layer of the neural network, but never more than the number of nodes in the layer. Positive and negative derivatives values are never added together, so the sum of the values in the packets of the same sign at a single layer will never be zero unless they are all multiplied by a weight of zero.

The embodiment illustrated in FIG. 5 implements a discriminator that separates data items that are instances of the category that it accepts from data items that are counter examples to that category. The preparation illustrated in FIG. 5A is not required for the embodiment illustrated in FIG. 5. However, if the embodiment illustrated in FIG. 5A is applied and if all the nodes with weights with mixed signs are instances of the embodiment illustrated in FIG. 5, then the separation between examples and counter examples is maintained all the way from the output back to node 504 in FIG. 5 and thence to nodes 502 and 503.

In the embodiment illustrated in FIG. 5, node 504 is a combining node with selective back propagation without an associated conditional error judgment node. The embodiment illustrated in FIG. 5 enables a type of training that differs from mini-batch stochastic gradient descent in several ways. In addition to the differences in training, the embodiment in FIG. 5 enables deep neural network training to be integrated with machine learning systems of types other than neural networks.

In the embodiment illustrated in FIG. 5, the computer system trains nodes 502, 503 and 504 together on a discrimination task. The computer system trains node 502 as a detector and trains node 503 to detect counter examples to the category detected by node 502. The combining node 504 acts as a discriminator node, with a positive weight for its connection from node 502 and a negative weight for its connection from node 503. The first difference from normal back propagation training is that, in some embodiments, the connection weights from node 502 and node 503 to node 504 are not trained, but are fixed at, for example, equal but opposite values, such as +1 and −1, respectively. Whether the connection weights to node 504 are to be trained or not, the computer system receives back propagation values for node 504 from a higher network or local objective 505 error function and selectively transmits back propagation values to nodes 502 and 503.

In one illustrative embodiment, the combining node 504 has the following activation function:

$$F(z_1, z_2) = \left(e^{z_1/2}\right)/\left(e^{z_1/2} + e^{-z_2/2}\right),$$

where $z_1$ is the output from node 502 and $z_2$ is the output from node 503. Other embodiments may use other activation functions to embody the combining node 504 serving as a discriminator between the category or collection of categories detected by node 502 from the category or collection of categories detected by node 503.

In the embodiment illustrated in FIG. 5, a second, much larger, difference from normal back propagation training is that the back propagation from the combining node 504 is selective, based on the sign of the partial derivative of the error function with respect to the activation output of the combining node 504. In some embodiments, the error function may be based on a local node-specific objective computed as described in association with FIG. 4.

A third difference in the training of nodes 502, 503 and 504 is that the subsystems determining the activation values of nodes 502 and 503 do not need to be neural networks, nor does their training need to be based on back propagation of partial derivatives or on gradient descent. The subsystem of either node 502 or node 503 may be some other type of machine learning system with a different training method. The only requirement is that each subsystem be capable of learning to model a set of data examples of a category to be detected and to compute some measure of fit to the model or detection score for an arbitrary data example that is an example of an instance of the target category or, in some embodiments, an instance of a counter example. For example, either subsystem may be a model of one or more clusters, a set of radial basis functions, a mixture of Gaussian models, a decision tree, a random forest, or a conditional random field. Of course, either subsystem also may be a neural network. Even if a subsystem is a neural network, its training method may be different from stochastic gradient descent based on minibatches.

If the embodiment illustrated in FIG. 5 is used for every decision node in a network, a unique property results from the training process. The selective back propagation process of FIG. 5 causes both the positive and negative side of each decision node to be represented by an explicit set of data examples. Therefore, any decision can be understood and explained by way of examples.

Tags or information packets may be used in a generalization and alternate embodiment of FIG. 5. This generalization is discussed in association with the illustrative embodiment shown in FIG. 5B, which illustrates an alternate embodiment and a major generalization and extension of the techniques illustrated in FIGS. 5 and 5A. In the embodiment illustrated in FIG. 5, the units 502 and 503 each build a model from positive examples of the class that it is individually designed to model. Unit 502 builds a model for the data items that have a positive partial derivative at the output of 504. These items are called "examples" of the class that is designed to be detected by the combining node 504. Unit 503 builds a model for data items that have a negative partial derivative at the output of the combining node 504. These data items are called "counter examples" of the combining node 504. The selective back propagation from combining node/unit 504 is such that nodes/units 502 and 503 each only receive examples, not counter examples, to the set of data they respectively are designed to detect, except in an embodiment in which the combining node 504 only partially blocks the back propagation.

An alternate embodiment of the techniques illustrated in FIGS. 5 and 5A is for the computer system in FIG. 5A to implement the back-propagation process as message-passing system. In this embodiment, in block 512N, the computer system creates a packet comprising the back-propagation value and a tag with the value that indicates a "reward." In block 512P, the computer system creates a packet comprising the back-propagation value and a tag with a value that indicates a "penalty." In this embodiment, the computer system flips the tag for a packet when there is a sign change in the propagated partial derivative of the error function. The rule that the computer system never add together two back-propagated values with opposite sign is replaced by a rule that the computer system never add together two back propagated values with differing tags. With only the tags "reward" and "penalty" as described so far, this embodiment is equivalent to the embodiment illustrated in FIGS. 5 and 5A. However, the new rule is easily generalized to embodiments in which there are additional values for the tag or additional tags.

An embodiment with a minor extension is enabled by allowing the tag to have a value that indicates "unknown." In a mixed network in which during back propagation the computer system sometimes allows positive and negative back-propagation values to be added together, the tag becomes "unknown" whenever such an addition occurs. One implementation of mixed back propagation is for the computer system to designate for each node whether back propagation at that node is allowed to add together two packets with different tag values. If two packets with different tag values are added together, the computer system sets the new tag value to "unknown." Note that the tag is not automatically set to "unknown" for a node that is allowed to add together packets with different values. It can be a data dependent change such that the new packet only gets the tag "unknown" if the packets for the current datum have different tags.

The set of mixed networks just described is a superset of both the set of conventional neural networks and the set of neural networks with strict enforcement of the no mixing rule. Therefore, the set of machine learning tasks that can be done to a given level of performance with mixed networks is a superset of the tasks that can be done to that level of performance with either conventional neural networks or strict no-mixing networks.

Blocks 541-549 in FIG. 5B comprise a flow chart that embodies selective back propagation training of mixed neural networks with a variety of tags and selective back propagation rules. Blocks 531, 532 and 533 are lists of over lapping sets of node types. The node types in each list share a property that interacts with the process of selective back propagation. Each list gives examples but is not intended to be an exhaustive list of node types with the indicated property. Block 534 is a list of example tags and block 535 is a list of forms of knowledge representation that interact with the process of selective back propagation.

The embodiment illustrated in the flowchart of FIG. 5B builds an ensemble or an ensemble-like cascade, including the special case in which the "ensemble" has only one member. Each pass through the loop from block 541 to block 549 trains a neural network. The neural network trained in a pass through the loop from block 541 to block 549 is then added as a new member to an ensemble or may be integrated into a cascade of networks connected by comparative judgment nodes and combining nodes with selective back propagation, as illustrated in FIG. 7.

In one example embodiment, at first the computer system creates several ensemble members or cascade members with the knowledge representation "none," which simply means that the loop from block 542 to block 548 trains a conventional neural network, possibly including judgment nodes and combining nodes with selective back propagation, but not including nodes such as node 504 in FIG. 5 or the embodiment illustrated in FIG. 5A. Then the computer system creates several ensemble members or cascade members with an example-based knowledge representation.

In block 541, the computer system chooses a knowledge representation, which for this example embodiment is "example-based." The name "example-based" refers to any embodiment in which selective back propagation is used to separate data such that models can be built separately for examples and counter examples of a class of data, which includes any embodiment that comprises training a node such as illustrated by node 504 in FIG. 5.

After block 541, the computer system proceeds to block 542 to start a set of three nested loops. The loop from block 542 to block 548 represents repeating iterative update training until a convergence criterion is met. The loop from block 542 to block 547 represents accumulating statistics such as estimates of the gradient of the error function for all the data examples in a mini-batch or mega-batch. The loop from block 543 to block 546 represent one pass of selective back propagation through the network.

In block 542, the computer system computes the forward activation for all the nodes in the network. In this first example embodiment, this is a standard feed forward activation computation with no knowledge-representation specific steps.

In block 543, the computer system checks whether the current node either by itself or as part of a multi-node set performs an explicit or implicit classification or recognition. For example, a node with a sigmoid-like or other bounded monotonic activation function may be considered to be a two-class classifier. A node that is a member of any softmax set may be considered to be a node of a classifier, whether or not the nodes in the softmax set have known labels in the training data. An error judgment node and a conditional judgment node may be considered to be a two-class classifier. A node in a set of nodes that make a decision by majority or plurality vote or may be considered to be a node in a classifier. More generally, any node for which there is one or more incoming connections with a positive weight and one or more incoming connections with a negative weight may be considered to be a classifier. The thresholds for such a classifier may be trained, for example, by the embodiment illustrated by blocks 810, 812 and 813 of FIG. 8. Since the weights are learned parameters that change during training, the status of a node with a set of incoming connections weights with mixed signs is not a permanent property of the node. It may change during training.

In block 543, if the computer system determines that a node may be considered to be a classifier or recognizer, the computer system then decides, based on system design specifications and hyperparameters, whether to create tags and to partition the values it back propagates along its incoming connections based on the values of the assigned tags. The computer system then proceeds to block 544.

In block 544, if the node is one of the types of nodes listed in block 533, the computer system may block back propagation to come of its incoming connections even though they contributed to its activation value for the current datum. When the computer system blocks such back propagation, the back propagated values no longer obey the chain rule and are not equal to the partial derivatives of the error function. Notice that softmax and discriminator nodes occur in both the list in block 531 and the list in block 533. For such nodes, the computer system may both create tags in block 543, and selectively block back propagation in block 544. For example, in the illustrative embodiment shown in FIG. 5A, the computer system may create the tags "reward" and "penalty" and only back propagate the "reward" tag to the node in the softmax set that corresponds to the correct answer and only back propagate the "penalty" tag to the best scoring incorrect answer.

In block 544, the computer system may treat a MAX node as a special case, being less selective than normal back propagation. That is, the computer system may back propagate to a small number of source nodes with values close to the maximum value, whereas the activation of the MAX node and the derivative of the error function only depend on the node or nodes that have the maximum value, not on those close to the maximum value.

In a set of nodes that make a decision by voting, in block 544, the computer system may select a representative subset of the nodes that voted for the correct answer to receive and back propagate the "reward" tag and a representative subset of the nodes that voted otherwise to receive and back propagate the "penalty" tag.

In block 545, the computer system checks the tag of a packet to be potentially back propagated along one of its incoming connections against any restriction in the specification of the source node. The computer system blocks back propagation for this incoming connection if the specification of the source node indicates that the node is not to receive packets with the tag value associated with the packet. For example, in the embodiment illustrated in FIG. 5, node 502 and node 503, both have specifications to only accept packets with the tag "reward." A "reward" tag sent by the computer system to node 503 results from the tag flip of a "penalty" tag sent by the computer system to node 504 due to the negative weight of the connection from node 503 to node 504.

With a node that represents a probability mixture distribution, the computer system may select a proper subset of its incoming connections and block back propagation to the rest. For example, the computer system may select only one or a small number of incoming connections, those for which the product of the incoming weight times the activation of the source is at or near the maximum value. In some embodiments, the selection may be based only on the magnitude of the incoming weight. In some embodiments, the selection may be based only on magnitude of the activation value of the source node.

In block 544, the computer system also selectively blocks back propagation as specified in the design of any combining node with selective back propagation associated with an error judgment node or a conditional error judgment node.

In block 546, the computer system implements the back propagation along one incoming connection. The loop from block 546 back to block 545 loops over all the incoming connections of the current node. The loop from block 546 back to block 543 loops over all nodes in the network, proceeding backwards from the output nodes to the input.

In block 547, the computer system adds the back propagated value associated with each learned parameter for the current datum to a value that is accumulated for all data in a mini-batch or a mega-batch. If the current datum is not the end of the batch, the computer then loops back to block 542 to begin the processing for the next datum. If the current datum is the last datum in the batch, the computer system proceeds to block 548, where the computer system updates the learned parameters based on the statistics accumulated in block 547.

At block 548, the computer system then checks to see if a stopping criterion has been satisfied. The analysis of stopping criteria in various embodiments of the invention is more sophisticated than with conventional neural networks. For example, in the embodiment illustrated in FIG. 6, in block 606, the computer system may detect degradation in performance on development data that in training a conventional neural network might satisfy a criterion for early stopping. However, in various embodiment of the invention, node-specific early stopping may be applied instead, the training continuing for the rest of the network. Similarly, in block 606, the computer system may detect stationarity which in conventional training might be part of a test for convergence, which would be a criterion for stopping. However, in various embodiments of the invention, such as block 608 of FIG. 6, additional structure may be added to the network or additional elements may be added to an ensemble or to an ensemble-like network, such as a network with a cascade of error judgment nodes. Thus, even convergence to a global minimum of the error function of the network as currently configured is not necessarily a sufficient criterion for stopping the training.

In block 548, the computer system may use stopping criteria such as: (1) achieving a predefined level of performance, (2) reaching a predefined limit on some resource, such computation time for training, complexity of the network being built, amount of memory required, or the amount of time to compute the feed forward activation for inference in a deployed system, or (3) an estimate of the cost-performance trade-off of continued training including an estimate of the performance improvement, if any, being achieved by adding additional structure versus the cost.

Until a stopping criterion is met, after block 548, the computer system returns to block 542 to begin another iteration of training. Once the stopping criterion is met, training for the current ensemble or cascade member is completed and the computer system proceeds to block 549, where the computer system adds the current network to the ensemble or cascade and checks a stopping criterion to decide whether to continue adding new members to the ensemble or cascade, again based on an estimate of the cost/performance trade-off of continued training.

In other embodiments of FIG. 5B, other types of knowledge representations and/or additional tags may be used.

In general the embodiment illustrated in FIG. 5 allows the computer system to train node 502 and its subsystem on positive examples of the class to be detected by node 502 and also train node 503 and its subsystem on positive examples of the class to be detected by node 503. Among the benefits of training a subsystem only on positive examples is that there are fast training algorithms for training on a set of positive examples. Another benefit is that the decision boundary between two sets defined by positive examples is often a much simpler, easier to interpret and more robust boundary than a boundary determined between two models each of which is trained on a mixture of positive and negative examples.

In the embodiment illustrated in FIG. 5 without tags or with only {"reward", "penalty", "unknown"} tags, the discrimination by node 504 is of data examples for which node 504 receives a "reward" tag from those for which node 504 receives a "penalty" tag.

In blocks 512N and 512P of FIG. 5A, the computer system may instead create the tag "positive example" or simply "example" in block 512N and "counter example" in block 512. The tag would indicate whether the packet being back propagated is from the correct node for the current data or an incorrect node. The same information could alternately be embodied by tagging the packet with the category associated with the output node from which the compute system generates the back-propagation packet.

In this embodiment, the computer system adds a second tag to each back-propagation packet. The second tag is a numerical tag that counts the number of times that the sign of the partial derivative has been flipped as the back-propagated packet has progressed backward through the network.

In this embodiment, the computer system would check each of the tags in a packet received at node 504 and only back propagate the packet to a node with a specification that agrees with all the tags. For example, in an illustrative embodiment node 504 may have four connecting nodes with the specifications {<example, 0>, <counter example, 0>, <example, 1>, <counter example, 1>}, respectively. In this embodiment, the computer system would block back propagation for any packet with two or more sign flips and would back propagate any packet with zero or one sign flips only to the node that matches the packet in both the "example"/ "counter example" tag and in the number of sign flips. In this embodiment, the tag <example, 1> would represent a back-propagation packet back propagated from the output node corresponding to the correct answer but passing through one connection with a negative sign. To lower the error rate on this datum, the computer system needs to train the subnetwork to lower the score of node 504, so the connection weight from the node with the specification <example, 1> should have a negative weight. Similarly, the connection from the node with the specification <counter example, 1> should have a positive weight.

In other embodiments, a lower level node may have a specification of one of the output categories, in which case in an embodiment based on a generalization of the selective back propagation rule illustrated in FIG. 5, all back propagation to that node would be blocked except for instances of the specified category.

With an ontology knowledge representation, a lower level node may have a specification for a class higher in the ontology. For example, the ontology might have the relation "a cat is a mammal;" the correct answer for the current datum might have the label "cat;" and the lower node might have the specification "mammal," which is higher in the ontology. If the back-propagation packet also has the tag "example," the computer system would not block back propagation to the lower node. If the back-propagation packet has tag "counter example," then the specification in the lower level node would need to match the label or be lower in the ontology.

As another example, in a deep neural network for image recognition or for speech recognition, a lower level node might have input from only a small portion of the image or a short section of the audio. If the knowledge source comprises a mereology with the relation "a node is part of a face," then the computer system may back propagate to a lower node with a specification "nose" a packet with the tag "face." If the mereology has the relation "the vowel EE is part of the word SEE" then the computer system may back propagate a packet with the tag "SEE" to a lower node with the specification "EE."

A more complex representation might include information about the likely location of a node within a face, or of the vowel "EE" with the word "SEE." With such a knowledge source, the computer system might back propagate only packets that match the relative location specification within some degree of tolerance.

The examples discussed above are only a few illustrative examples of the capability of explicit knowledge sources to be coordinated with selective back propagation. There are many other possible examples. The common thread of these examples is that the external knowledge representation is an explicit representation of interpretable, communicable knowledge. Coordinating training of a neural network with selective back propagation with such external knowledge makes the training of the network and the classifications of the trained network easier to understand and interpret.

FIG. 6 is an illustrative embodiment of another aspect of the invention. FIG. 6 is a combination of a system diagram 601-605 and a flowchart 606-609. In the embodiment illustrated in FIG. 6, node 601 is a node or set of softmax nodes in a neural network. Block 604 represents a measurable objective. It may be the objective of the parent network as whole, one of several objectives of the network, or it may be a local objective estimated as described in association with FIG. 4.

Node 602 is a type of judgment node, but it makes a different type of judgment than the error judgment nodes illustrated in FIGS. 1, 2, and 3. Node 602 is a so-called "performance progress judgment node." In the embodiment illustrated in FIG. 6, in node 602 the computer system judges the performance progress of node 601 toward the objective 604 during the course of the training process. In block 603, the computer system accumulates such performance statistics over multiple iterative updates in the learned parameters. It may accumulate such statistics over multiple epochs of the full training set. With an extremely large training set, it may only accumulate the statistics over a mega-batch where the number of data examples in the mega-batch is sufficiently large so that the confidence intervals on the statistical estimates meet a specified criterion. In performance progress judgment node 602, the computer system uses these statistics to make decisions about changes in the training process.

By way of example, without limiting the scope, such changes in the training process may be to stop back propagation to node 601 in step 607 or may be the addition of new network structure in step 608. In some cases, the computer system may do both.

In block 606, the computer system decides which actions to take. During stochastic gradient descent training, performance may fluctuate from one minibatch to another and, to a lesser degree, may even fluctuate from one epoch to another. However, at least initially, performance will gradually improve. Eventually, the rate of improvement slows down, and eventually the performance may begin to degrade. This degradation is taken as an indication that the training process is over fitting the available training data. In prior art systems, a recommended best practice is to stop the training entirely once this degradation is detected at a level beyond the random fluctuations.

However, stopping the training entirely is not the best action in a system in which some parts of the systems are still actively learning. This situation is especially likely to occur in a system that has subsystems of multiple types such as the subsystems of nodes 502 and 503 in FIG. 5. The situation is also likely to occur in systems in which new structure can be added during the training process, as in step 608 of FIG. 6 and in the embodiments illustrated in FIGS. 8 and 9. Some parts of the network may have reached a state in which further training degrades performance while new parts of the system are still learning and improving performance. In addition, many subsystems may have continued training past the point at which they are degrading in their performance, but the degradation goes undetected because the early stopping test is based only on detecting degradation in the performance of the system as a whole. In contrast, in the embodiment illustrated in FIG. 6, in steps 602 and 606, the computer system tests the performance of node 602 separately from the performance of other nodes and from performance of the network as a whole.

In contrast to prior art early stopping, if the computer system detects degraded performance in step 606, in step 607 the computer system instructs performance progress judgment node 602 to block further back propagation to node 601 by means of control 605, without stopping the training of other nodes.

In step 606, the computer system also checks whether node 601 is at or near a stationary point, as indicated by the magnitude of change in its learned parameters over the course of an epoch or of a mega-batch sufficiently large that its statistics are accurate estimators of the full epoch. In neural network training, a stationary point is usually a saddle point rather than a local minimum. However, even if the stationary point is a saddle point, it may require hundreds of thousands or millions of mini-batch stochastic gradient descent update steps to first approach the saddle point, then to successfully change direction and move away from the saddle point. This slow process is one of the leading causes of requiring a large number of updates to train a neural network.

As will be explained in association with FIG. 9, if the computer system detects evidence of stationarity in the training process in step 606, in step 608 the computer system may add additional structure to the network that bypasses the stationary point as described in FIG. 9. In some embodiments, stopping the back propagation to node 601 in step 607 may create an opportunity to improve performance by splitting node 601 or by adding new structure, so in some embodiments, the computer system proceeds to step 608 after step 607. When the computer system adds new structure of the types illustrated in FIGS. 1, 2, 3 and 5 (e.g., the error judgment and combining nodes), some of the weights in the new structure and the expanded network may immediately give higher performance before any additional gradient descent training. The addition of the new structure allows the computer system to escape from the previous stationary point. After steps 607 and 608, the computer system proceeds to the steps illustrated in FIG. 8, as indicated by step 609.

FIG. 7 is an illustrative embodiment of an aspect of the invention that introduces another type of judgment node, a so-called "comparative judgment node" that judges the relative reliability of two other nodes or of two subsystems or two members of an ensemble. Units 701 and 711 are both nodes in a neural network, machine learning subsystems based on neural networks or other machine learning methods, or members of an ensemble of machine learning systems. In the embodiment illustrated in FIG. 7, it is assumed that both units 701 and 711 may be trained by the computer system back propagating partial derivatives or be trained by the computer system back propagating data examples as in some embodiments of subsystems 502 and 503 in FIG. 5. Although only two units 701 and 711 are shown, it is to be understood that the embodiment illustrated in FIG. 7 also applies to a plurality of n units for any n>1.

In some embodiments, there may also be a combing node or unit 705, similar to the combining nodes 103, 213, 504 described above. For example, if units 701 and 711 are detectors for the same class, the activation of the combining node 705 may be the maximum of the outputs of units 701 and 711. If units 701 and 711 are discriminator nodes, then node 705 may be a discriminator where the input to its activation function is a weighted sum of the activation functions of node 701 and 711. If the units 701 and 711 are classifiers with n≥2 output categories, unit 705 may be a set of n nodes where the input to the activations function of the i-th node in 705 is a weighted sum of the outputs of the i-th nodes of units 701 and 711, respectively.

There is also a local objective 715. The objective 715 may be determined either by known labels in the training data or by an estimation process such as described in association with FIG. 5.

Unit 702 is comparative judgment node trained by the computer system to predict which of the two units 701 or 711 is correct on any datum on which they disagree. When there are more than two units like 701 and 711, there are several possible embodiments for unit 702. Unit 702 may be a complex subsystem that chooses the one unit that is most likely to be correct among n units that do not all agree. Alternately, unit 702 may comprise a binary tree of comparative judgment units that each only decide which of two disagreeing units is correct.

With a philosophy similar to the combining node 103 in FIG. 1 and other error judgment combining nodes, the activation function of combining node 703 in a preferred embodiment accepts the output from units 701 and 711 when they agree, but always accepts the judgment of unit 702 when units 701 and 711 disagree. Also, as in the embodiments of the error judgment nodes in FIGS. 1, 2 and 3, the combining node 703 blocks back propagation from unit 703 or unit 702 to units 701 and 711. The rules for activation of and selective back propagation from node 703 generalize in the natural way to embodiments with more than two units like units 701 and 711.

Units 701 and 711 each have a direct connection to local objective 715; that is, the error cost function for the units 701, 711 is to be minimized with respect to the local objective 715 (and/or other objectives) during training. In addition, they may each have connections that are not shown that connect them to the network objective 704, either directly or indirectly through other nodes in the network, such that their total error cost function may also (or jointly) be minimized with respect to the network objective. These connections or other nodes are not shown in FIG. 6.

Unit 702 may be trained by the computer system either on a set of training data 713 and/or may be trained on a disjoint set of development data 714. In unit 702, the computer system also accumulates performance progress data, and the computer system may detect stationarity as with performance progress judgment node 602 in FIG. 6. When unit 702 is trained by the computer system on development data, the computer system may also detect degradation in any one of the units like 701 or 711. And the computer system may implement node-specific early stopping.

In some embodiments, the process of building a comparative judgment node 702 and a combining node 703 with selective back propagation may be cascaded. That is one of the units 701 or 711 may already comprise a comparative judgment node or an error judgment node. The system illustrated in FIG. 7 may itself be a subsystem comprised by a larger system that also comprises one or more additional comparative judgment nodes.

In some embodiments, the computer system builds a cascade of such subsystems with comparative judgment nodes. Such a cascade can be extended indefinitely, with each new unit being structurally diverse with a goal that is very different from the previous goals until there are no more errors that can be corrected without over fitting so that there is no new goal. The overfitting can be detected by testing on development data that has be set aside from the training data and any development data that has been used in training any of the comparative judgment nodes or error judgment nodes.

Building such a cascade of subsystems with comparative judgment nodes is especially useful in building large, diverse ensembles.

In another illustrative embodiment, the computer system only partially blocks back propagation from combining node with selective back propagation 703 to unit 701 and/or unit 711. In this embodiment, the local objective 715 is optional. In some embodiments, the partial blocking may be controlled by unit 702. In other embodiments the partial blocking rate may be controlled by a hyperparameter. The hyperparameter may be a fraction less than one that reduces the weight of the back propagated value or the back propagation may be blocked except for randomly selected data items with the fraction to be selected set by the value of the hyperparameter.

Figure 8:
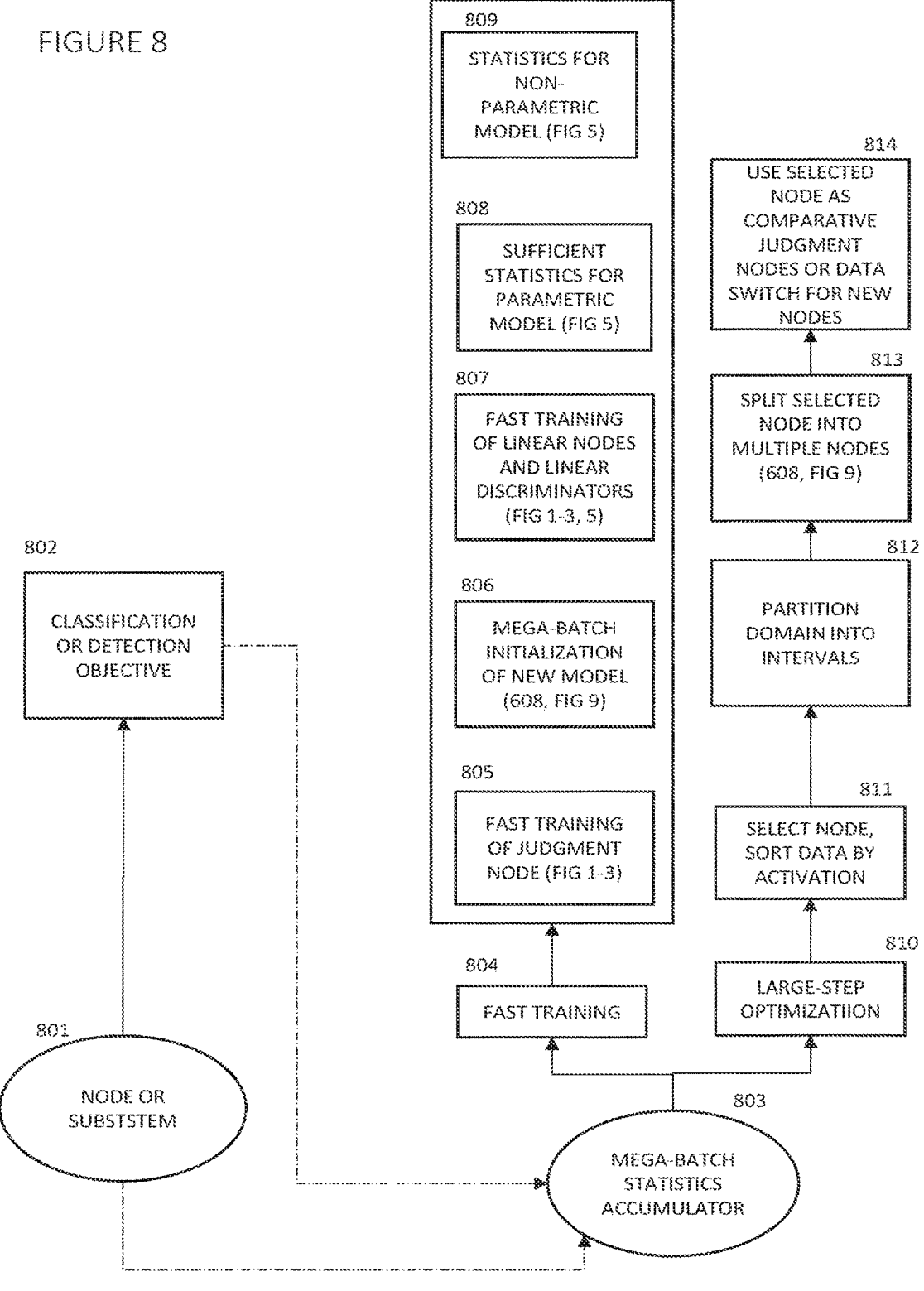
FIG. 8 is a diagram of various illustrative embodiments of an aspect of the invention that may enable substantial acceleration of the training process.

FIG. 8 is an illustrative embodiment of an aspect of the invention that may enable substantial acceleration of the training process in various embodiments. FIG. 8 is a combination of a system diagram 801-803, a collection of methods that may be used in any order 805-809 and a flowchart 811-814.

Oval 801 represents a node or a machine-learning subsystem (e.g., a portion of a neural network) with a classification or detection objective 802. In various embodiments, the computer system accumulates statistical measurements 803 over the course of what is called a "mega-batch." Typically, a deep neural network is trained by an iterative process of stochastic gradient descent in which an estimate of the gradient and an update to the learned parameters is computed for each mini-batch. To increase the frequency of the updates, the size of a mini-batch, typically 100-500 data items, is kept relatively small compared to the total number of training data items in a full batch or epoch. In contrast, a mega-batch is chosen to be large enough so that statistical averages accumulated over the mega-batch match the statistics for the full training batch with specified confidence intervals. The mega-batch may be the full training batch. Mega-batches were mentioned in association with block 603 and the stationarity test in block 606 in FIG. 6.

In various embodiments, the statistics accumulated by the computer system in 803 may comprise sufficient statistics for a parametric probability distribution, such as the means and covariance for a Gaussian distribution, statistics used in the training of a subsystem using a machine learning method other than a neural network, or non-parametric statistics.

Using the statistics accumulated in 803, in step 804 the computer system implements fast training of node or subsystem 801 using one or more of the techniques in blocks 805, 806, 807, 808 and 809. The blocks 805, 806, 807, 808 and 809 represent alternative methods of fast training that may be used independently by the computer system, not sequential steps in a flow chart.

In block 805, the computer system implements fast training of an error judgment node such as used in FIGS. 1, 2 and 3. An error judgment node such as node 102 in FIG. 1 and an associated combining node 103 with selective back propagation may be added to a network in which node 101 has already been trained, perhaps even to convergence, so that the combining node 103 corrects some of the remaining errors made by node 101. As illustrated in FIG. 2, a second error judgment node, correcting the errors made by the first error judgment node, may be added later.

In block 805, because back propagation to node 801 is blocked, the computer system may train the judgment node and its subsystem, if any, in isolation from the rest of the network containing node 801 which means that the training of the judgment node will inherently require less computation than training the full network. In addition, a judgment node may have a very small, simple subsystem. For example, a judgment node may simply be a single node connected directly to some of the inputs to node 801 and/or to other existing nodes in the network that provide context that allow different predictions of the output from node 801 conditional on the context. In addition, depending on the design of the judgment node and its subsystem, the techniques of blocks 806, 807, 808 or 809 may be applied to training the judgment node in block 805.

In block 806, the computer system uses training on the mega-batch to find initial values for the learned parameters for a node or set of nodes that are added to an existing network that is already partially or fully trained. Typically, training of a deep neural network is initialized by choosing the initial values of the connection weight at random with certain guidelines for the random distributions. However, when adding a new node to a network that is already partially or fully trained, random initialization of the new weights may result in a gradient descent learning process that may take as long as the training that has already been done for the existing network. In block 806, the computer system instead initializes the new model by training its learned parameters on the mega-batch, which may be much smaller than the full batch. Furthermore, in this initialization training of the new model, the learned parameters of the existing network may be kept fixed. In addition, depending on the design of the new model, the techniques of blocks 807, 808 or 809 may be applied.

In block 807, the computer system may use faster training techniques that apply to linear activation functions and/or linear discriminators. For example, if the number of inputs to the node is moderate, say tens or hundreds rather than thousands or millions, then iteratively reweighted least squares may be used in some embodiments. As another example, if the error function is approximated by a piecewise linear function, then linear programming may be used in some embodiments.

In block 808, if the model in 801 is a parametric probability distribution with sufficient statistics, the computer system computes those sufficient statistics on the mega-batch without even requiring an iterative process. If the model in 801 is a more complicated probabilistic model, then in some embodiments the computer system may estimate the learned parameters iteratively using the EM algorithm, which is well known to those skilled in the art of statistical pattern recognition.

In block 809, in various embodiments, the computer system may compute statistics for a non-parametric model.

For example, the computer system may cluster the data in the mega-batch using a clustering algorithm such as k-means, which is well-known to those skilled in the art of statistical modeling. As another example, in block 809 the computer system may build and train a decision tree as a subsystem for the new node.

More generally, the fast training in block 804 may comprise training a model with any other type of machine learning. In some embodiments training a different type of machine learning system may be faster than training a neural network by gradient descent.

In the branch starting with block 810, the computer system computes optimized values of one or more learned parameters without being limited to small-step gradient descent. As will be explained more fully in association with FIG. 9, without limiting other embodiments, the techniques of blocks 810, 811, 812, 813 and 814 may be applied by the computer system in particular in cases in which block 606 (see FIG. 6) has detected node-specific stationarity, that is, a situation in which the gradient with respect to the learned parameters associated with the node, computed over the mega-batch as a whole, has a magnitude close to zero for all of its components. This condition may be detected, for example, in block 606 of FIG. 6. In this condition, each learned parameter associated with the node may be analyzed in isolation, keeping the other learned parameters fixed because the other parameters are not changing significantly.

The branch starting with block 810 may use any method of large step or global optimization. By way of illustration without limiting other techniques, in block 811 the computer system sorts the data or a sample of the data by the activation value of a selected node with learned parameters that are in a condition of near stationarity as determined by a performance progress judgment node, such as node 606 of FIG. 6, or by other means. In a preferred embodiment, the node is further selected for the property of having at least one datum for which the magnitude of the partial derivative of the error function estimated on the at least one datum is larger than a specified threshold. Generally, there will be nodes with such data if the network still has errors or close calls.

In block 811, the computer system sorts the data or a sample of the data according to the input to the activation function of the selected node. Note that, because of the condition of stationarity, the partial derivatives of the error function must have an average value with a magnitude near zero when averaged over the full epoch or over a sufficiently large mega-batch. Therefore, if the selected node has at least one datum for which the magnitude of the estimated partial derivative of the error function is greater than the specified threshold, then there must be other data items for which the single-datum estimated partial derivative of the error has the opposite sign to make the magnitude of the average close to zero.

Then, in block 812, the computer system partitions the domain of the activation function into intervals. The intervals may be chosen by any method that separates the data into a plurality of the intervals. For example, the n intervals may be chosen to divide the interval from the lowest activation among the sample of data to the highest activation among the sample of data into subintervals of equal length. In some embodiments, the computer system uses a more elaborate procedure to determine the intervals, as illustrated, for example, in FIG. 12.

In block 813, the computer system creates new nodes corresponding to each of the intervals in the partition. In an illustrative embodiment, the computer system defines the activation function of the node corresponding to an interval to have the same value as the activation function of the selected node for data for which the input to the activation function is within the interval. In some embodiments, the activation function of an interval-specific node differs from the activation function of the selected node by an additive constant. In an illustrative embodiment, the activation function of an interval-specific node is linear outside the associated interval and continuous with the activation values at the ends of the interval, with the slope outside the interval determined by a hyperparameter.

In an illustrative embodiment, in block 813, the computer system makes a copy of the subnetwork of nodes, with the copy being connected directly or indirectly into the selected node. In some embodiments, the subnetwork is copied through lower layers until an input node is reached or until a node that has been frozen by early stopping has been reached.

In block 814, in some embodiments, the computer system makes an additional "frozen" copy of the selected node and the subnetwork of the selected node, which additional copy is connected directly or indirectly into the original selected node. The computer system then blocks all future back propagation to the "frozen" copy of the selected node and its subnetwork. In this embodiment, the computer system uses this copy of the selected node as a data switch. In all further training, and in deployment, during the forward activation computation, for any datum the frozen copy of the selected node blocks the activation of any of the interval-specific nodes except for the interval corresponding to the input value to the activation function for the datum.

In block 814, in some embodiments, the computer system creates a softmax set from copies of the selected node. Each node in the softmax set receives input from the same connections as the selected node. The created softmax set is then trained as a set of comparative judgment nodes for the interval-specific nodes.

FIG. 8 illustrates embodiments for accelerating the training or improving the performance of an individual node. There are innumerable ways to use various embodiments of the invention to build and train a multi-layer network based on the techniques of FIG. 8 and other figures/techniques herein. By way of illustration, FIG. 9 summaries four examples of strategies for building and training a multi-layer network with improved performance using various embodiments of the invention.

Figure 9:
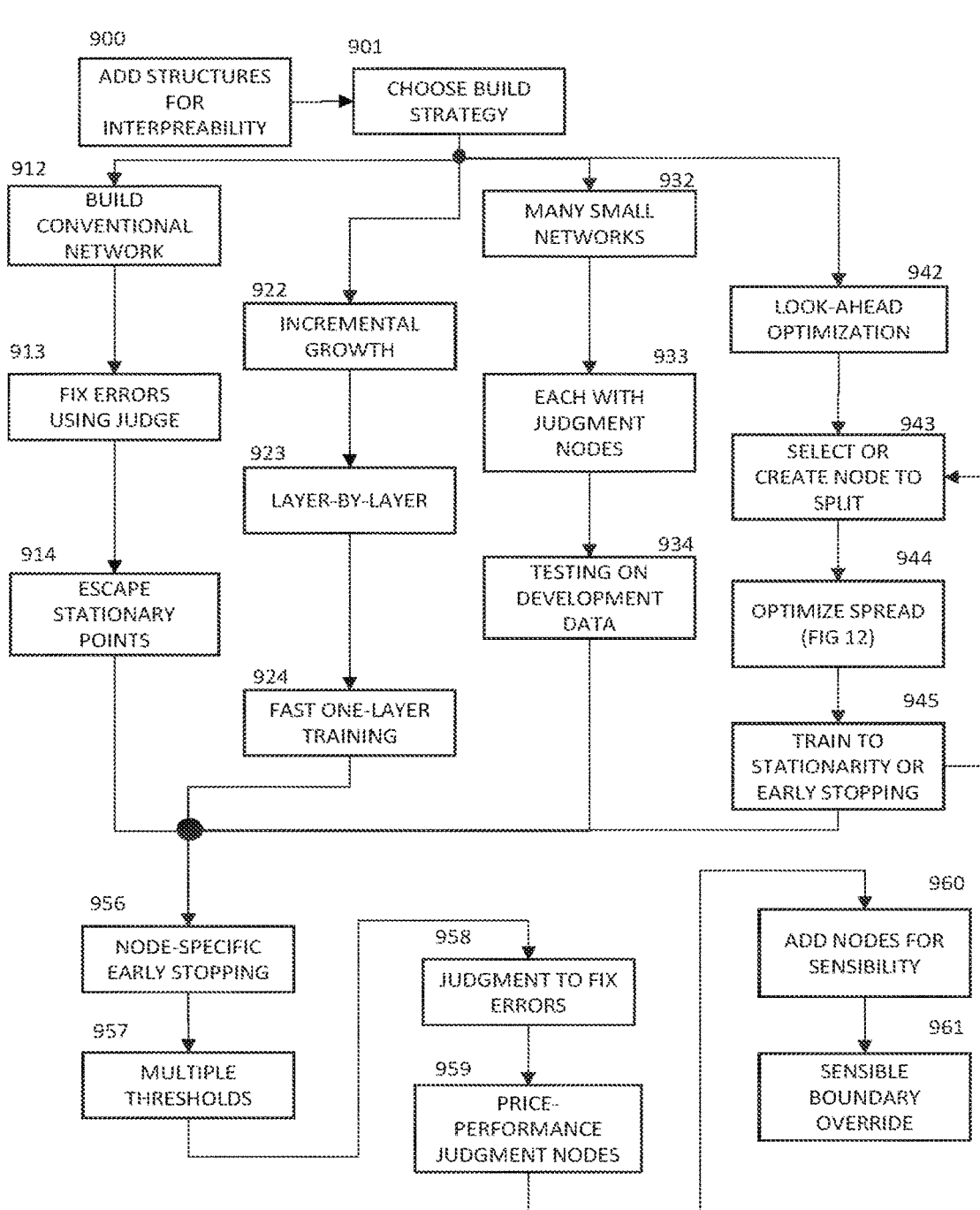
FIG. 9 is a chart organizing the key elements used in illustrative embodiments of various aspects of the invention.

FIG. 9 is a chart organizing the key elements used in each of the four example strategies, rather than a flow chart with sequential steps. In block 900, the computer system adds structures to the network that are designed to increase interpretability and robustness of the network. For example, the computer system may add an autocorrelation structure with a bottleneck layer to the network. The structure of an autocorrelation network with a bottleneck layer is well known to those skilled in the art of neural network architectures. An autocorrelation structure comprises an encoder network, a bottleneck layer and a decoder network. The output of the decoder network has the same number of nodes as input to the encoder layer. The bottleneck layer creates a bottleneck by having fewer nodes than the input to the encoder and/or other restrictions such as a constraint or regularization that causes the activation of the nodes in the bottleneck layer to be sparse. An autocorrelation network is trained to make the output of its decoder network match the input to its encoder network as well as possible, subject to the limitation caused by the bottleneck. When the structure of an autocorrelation network is added to the network, the autocorrelation objective of the autocorrelation structure retains the objective of the relationship of its output to its input. This secondary objective provides regularization for parts of the larger network that are connected to the autocorrelation structure. As another example, the computer system may add one or more sets of softmax nodes at various locations in the network. In some embodiments, there may be some training data for which the nodes in an added softmax set have labels. In other embodiments, the nodes in an added softmax set may be unlabeled in the training data, but after training examples of the data associated with a node in a softmax set may be interpreted from the set of data that has been trained to be associated with high activation of the node. As a third example, the computer system may add one or more node sets with a sparsity constraint or regularizer. As yet another example, the computer system may add nodes with perceptron or other piecewise constant activation functions and accompanying error correction nodes with combining nodes with selective back propagation to one or more layers of the network.

In block 901, the computer system chooses one of the illustrative build strategies represented by the paths starting with blocks 912, 922, 932 and 942 respectively, In block 912, the computer system determines the strategy for this branch of the diagram to be based on starting with a conventional deep neural network. The selected initial network may be a pretrained neural network or a network that is trained by the computer system in block 912. In the rest of this branch of the diagram, the focus is on fixing errors that are made by the conventional network obtained or newly built in block 912.

In block 913, the computer system fixes errors using one or more error judgment nodes and combining nodes with selective back propagation, as illustrated in FIGS. 1, 2 and 3.

In block 914, the computer system uses embodiments illustrated in FIGS. 6 and 8 in order to help the training process make a change in the learned parameters from a situation of near stationarity in which the magnitude of the gradient is close to zero to a situation in which the magnitude of some of the partial derivatives are significantly different from zero enabling improvement in performance. The computer may make large step updates to the existing learned parameters or may add new structure to the network, as described in various blocks in FIGS. 6 and 8.

Blocks 956, 957, 958, 959, 960 and 961 are shared by each of the four build strategies. In block 956, the computer system tests for and implements node-specific early stopping as illustrated in FIG. 6. The node-specific early stopping helps prevent over fitting during training without halting the entire training process.

In block 957, the computer system creates multiple thresholds in an activation function or multiple nodes with differing thresholds, as discussed in association with FIG. 3 or based on the data sort operation in block 811 of FIG. 8.

In block 958, the computer system monitors the performance of an individual node by accumulating data over mega-batches, optionally including development data that is disjoint from the set of training data. If the performance is judged to be inadequate based on some criterion in the system specification, then the computer system takes corrective action such as adding an error judgment node and a combining node with selective back propagation as illustrated in FIGS. 1, 2 and 3.

Figure 12:
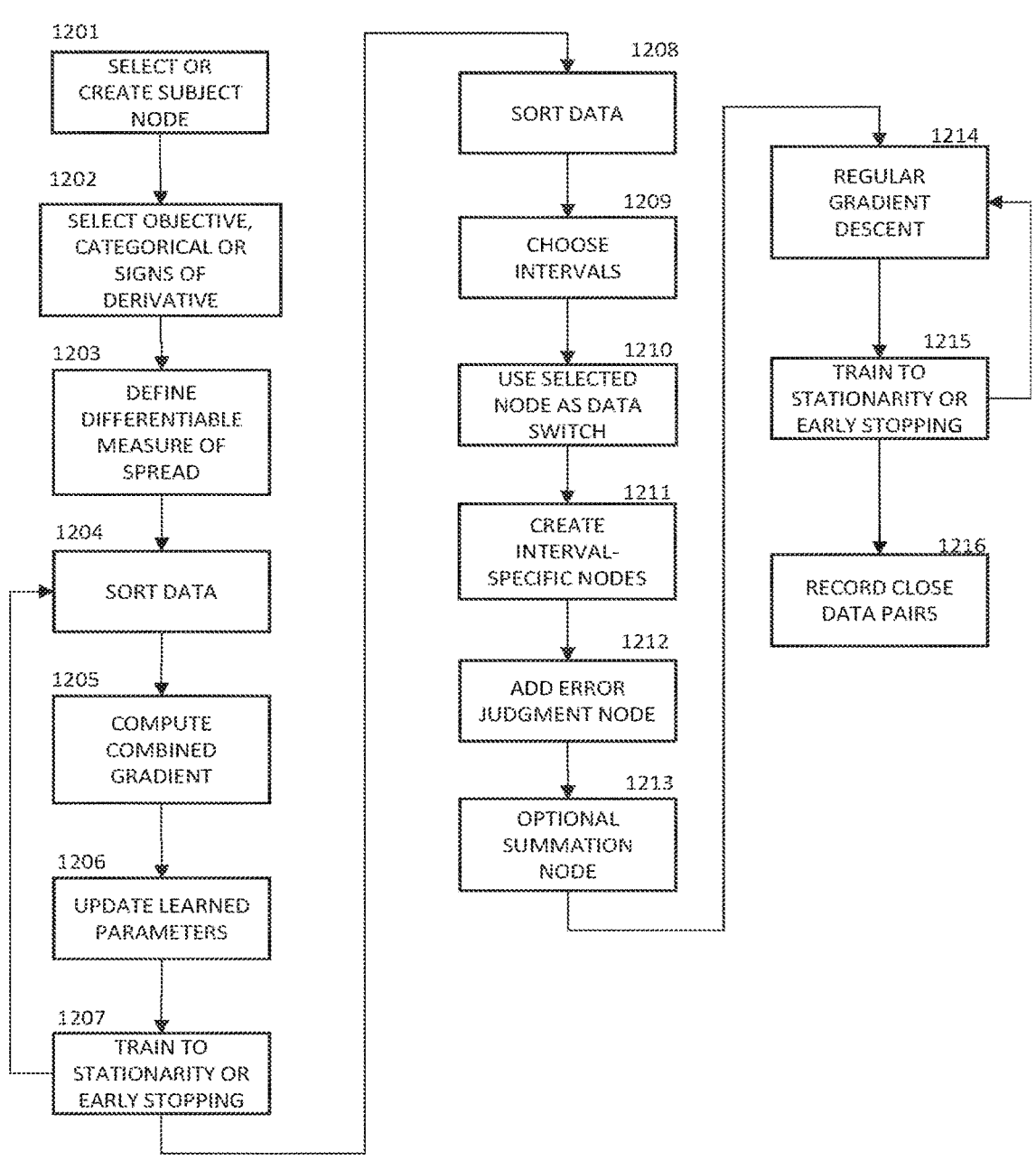
FIG. 12 is a diagram of an illustrative embodiment of an aspect of the invention that may improve the performance of a portion of a network that has already been trained.

In some embodiments, in block 959, the computer system uses one or more price-performance judgment nodes to decide whether to reduce the number of subnetworks that are created in operations, such as the node splitting discussed in association with blocks 811-814 of FIG. 8, blocks 942-944 of FIG. 9, and various blocks of FIG. 12. A price-performance node comprises a node structure like an embodiment of a comparative judgment node, such as node 702 of FIG. 7, except with a different purpose and a different training procedure. In an embodiment of block 959, the computer system first builds two or more versions of a subsystem that have different complexity. For example, the computer system may build two subsystems each comprising an interval-dependent node and its subnetwork, such as created in blocks 811-814, with the two subsystems differing in the number of intervals in the partition of the domain of the selected node. In an illustrative embodiment, each of the subsystem is connected to the price-performance judgment node with a selective back-propagation connection, like the connections from modes 701 and 711 to 702 in FIG. 7.

The ensemble members or subsystems 701 and 711 connected to the comparative judgment node in FIG. 7 are designed and trained to complement each other, they may even be designed and trained to maximize their diversity. In contrast, in the illustrative embodiment of block 959, the subsystems connected to a price-performance judgment node are each designed and trained to do the same task, not to be diverse. Each subsystem connected to the price-performance judgment node is designed and trained to operate alone, without the other.

However, they are designed and trained to represent two or more distinct points on a price versus performance trade-off curve. In the illustrative embodiment, the connection weight from each interval-specific subsystem is non-negative and the sum of the weights is constrained to equal 1.0. The cost function to be minimized during the training of the price-performance judgment node may be, for example, a weighted combination of the error function of the parent network plus a term for each of the subsystems that measures the cost of that subsystem based on some formula specified in the system design. In the illustrative embodiment, for example, the cost may be proportional to the number of intervals in the partition. The training of the price-performance node may comprise development data because, although the weights of the connections from the interval-specific subsystems are trained, the back propagation is blocked from the interval-specific subsystems themselves. Then the performance measurement made by the price-performance judgment node is an unbiased estimate of the test performance on new data, not the performance on training data. In particular, the performance measurement comprises errors that might be caused by overfitting. A more complex subsystem might not only have a higher cost, it may also make more errors and have a higher value for its error cost function. Once the weights to the price-performance judgment node have been trained, the computer system chooses the subsystem with the highest connection weight to the price-performance node. Then the computer system deletes from the network the price-performance node and all the non-chosen subsystems.

In block 960, the computer system adds new nodes to the network with the position and connections of each new node designed to enhance the ability of the embodiments of block 961, blocks 942-945 and FIGS. 12 and 13 to find sensible boundaries. For example, the new node may receive direct connections from an input node of the parent network and/or a direct connection to an output node of the parent network. The new node may also have a connection from or to a node in the network that is relatively easy to interpret. The node with the connection to or from the new node may have an associated category label because it is an output node of a subnetwork that has been trained as a classifier, or it may have an associated category label directly in the training data. The node with the connection to or from the new node may be part of a structure designed for interpretability, such as the structures added in block 900. The node may be related to an external knowledge representation, such as an ontology, mercology, semantic network, or grammar as illustrated in FIG. 5B.

In some embodiments, in block 961, the computer system develops sensible boundaries and a method for overriding the decision of the parent network by the decision of one of the sensible boundaries, as in the embodiment illustrated in FIG. 13. The processing of the embodiments illustrated in FIG. 9 terminates with block 961, in cooperation with the techniques illustrated in blocks 942-945 and FIG. 12.

In block 922, the computer system determines the strategy for this branch of the diagram to be one of incremental growth of the network. In block 923, the computer system implements layer-by-layer increment growth. In various embodiments of the invention, a network may be grown with additions made in any order. Layer-by-layer increment growth is shown in FIG. 9 by way of example, not as a limitation of embodiments of incremental growth in the invention. In block 923, the computer system may add a new multi-layer comprising judgment nodes and combining nodes with selective back propagation and optionally comprising nodes of other types. The new layer may be placed above the previous output layer, just below the previous output layer, below the first inner layer directly above the input, or between any two inner layers (assuming an input layer is at the bottom and an output layer is at the top). In one example embodiment, the new multi-layer comprises an error judgment node and a selective back propagation node for every node in the layer that is to be just below the new layer in the new network. When the computer system adds a layer above the previous output layer, the new multi-layer further comprises a conventional output node for each node in the previous output layer. These new output nodes are added to provide back propagation of the error function, which would otherwise be blocked from other nodes by the combining node with selective back propagation. When the new multi-layer is added in other positions in the net, optionally additional conventional nodes may be added.

In block 924, the computer system trains the newly added multi-layer while initially holding the learned parameters for the rest of the network fixed or training them at a lower learning rate. Concentrating on one multi-layer comprised of error judgment nodes and combining nodes with selective back propagation enables several embodiments of faster learning than gradient descent training of a conventional neural network: (1) The connection weights of the combining node with selective back propagation are pre-specified and optionally require no training; (2) The error judgment node trained in isolation may be a simple one-level optimization problem, so gradient descent training may be faster than in more complex network; (3) The error judgment node may have a linear activation function without introducing multiple linear layers because the combining node with selective back propagation introduces non-linearity; (4) If the error judgment node has a linear or piecewise linear activation function, closed form or large-step optimization algorithms may be used; (5) The error judgment node training can focus on the errors made by the node being judged with the new classifier designed to be complementary to the first classifier, which is a much easier training classification task than, say, training a new classifier from scratch.

The layer-by-layer incremental growth of repeatedly adding a multi-layer comprising error judgment nodes and combining nodes with selective back propagation also solves a long-standing problem in neural network training. Layer-by-layer construction and training of a multi-layer network with perceptron activation functions for some or all the nodes, optionally including the error judgment nodes can be done using the embodiment represented by blocks 923 and 924. A multi-layer network with nodes with perceptron or other piecewise constant activation functions may increase robustness against noise or adversarial attacks with small incremental changes because the derivative of a piecewise constant activation function is zero almost everywhere.

The elements of the strategy branch of blocks 922, 923 and 924 continues with blocks 956, 957, 958, 959, 960 and 961, which have already been discussed.

In block 932, the computer system determines the strategy to be one of building a larger network from a plurality of smaller networks. The distinctive property of this approach is that each of the smaller networks can have an objective with its own training labels. Each smaller network can initially be trained stand-alone and then the smaller networks can be integrated into a larger network with further training for fine tuning. Optionally, even when trained as part of a larger network, each smaller network can retain its individual objective as well as the objective of the larger network, with the dual objectives having a regularizing effect on each other. In the larger integrated network, there may be multiple copies of a small network. In various embodiments, the multiple copies of a learned parameter may be tied together, sharing their training updates, or they may be trained separately.

In block 933, the computer system adds error judgment nodes to one or more of the small networks to help accelerate the training of the integrated network. In block 933, the computer system also adds performance progress judgment nodes to one or more of the small networks. The computer system also adds performance progress judgment nodes both for judging each small network's continued progress on its own objective and for judging a small network's progress on the objective of the full integrated network as back propagated respectively to each copy of the small network.

In block 934, the computer system tests the performance of each smaller network on development test data that has been set aside and is disjoint from the training data. The computer system then may detect the need for earlier stopping independently for each small network. The computer system may also detect the need of extra error correction capability for a small network. Such extra error correction capability may comprise the addition of one or more error judgment nodes with combining nodes with selective back propagation, adding new structure as in block 608 of FIG. 6, large-step mega-batch-based optimization as illustrated in FIG. 8, or other procedures described in association with other figures.

The strategy branch of blocks 932, 933 and 934 continues with blocks 956, 957, 958, 959, 960 and 961.

In block 942, the computer system selects to perform look-ahead optimization. In block 943, the computer system selects or creates a node as a subject node for look-ahead optimization as illustrated in FIG. 12. The look-ahead optimization in FIG. 12 trains the selected node in part based on a look-ahead estimate of the amount of performance improvement that might be achieved by a node-splitting operation such as illustrated in FIG. 12 and blocks 811-814 of FIG. 8. In some embodiments, during active training a node is not selected by the computer system in block 943 until the node has been trained to a condition of stationarity or to early stopping.

In block 944, the computer system performs the operations of blocks 1208-1216 of FIG. 12 for the selected node. In some, embodiments, the computer system performs all the operations of blocks 1201-1216 for the selected node. In some embodiments, the operations 1202-1207, are only performed on newly created nodes. Such a newly created node may be a node created by the computer system making a copy of a node selected in block 943 and its subnetwork.

In block 945, the compute system optionally trains the selected node and the newly created interval-specific nodes and their subsystems in isolation, that is, keeping learned parameters outside the subnetwork fixed, training the interval-specific nodes and their subsystems until they reach a condition of stationarity or early stopping. The computer system then resumes normal training.

From block 945, the computer system may return to block 943 to select or create another node to split. If the computer system decides based on some criterion not to return to block 943, the computer system proceeds to block 956.

Figure 10:
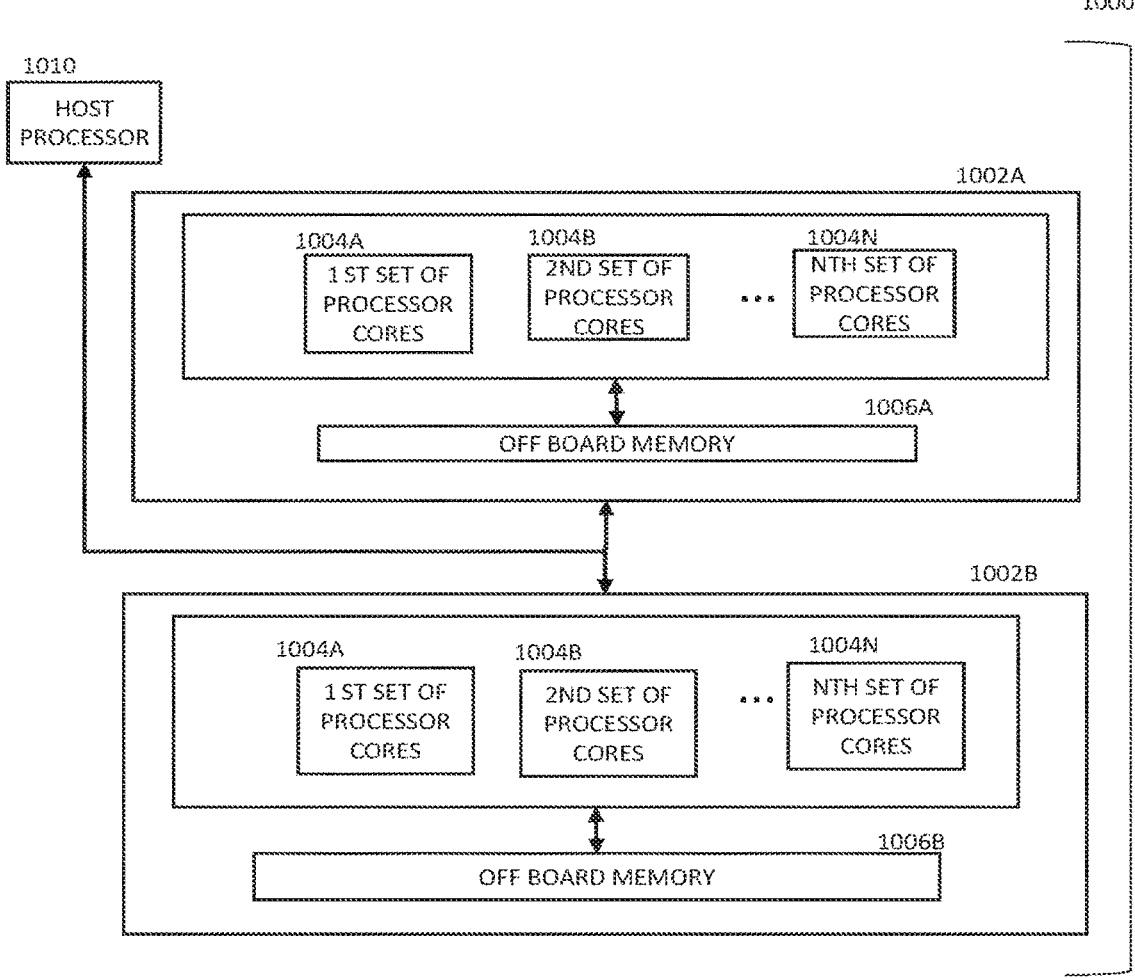
FIG. 10 is a diagram of an illustrative computer system that might be used in embodiments of various aspects of the invention.

FIG. 10 is a diagram of a computer system 1000 that could be used to implement the embodiments described above, such as the processes described above in connections with FIGS. 1-9. The illustrated computer system 1000 comprises multiple processor units 1002A-B that each comprises, in the illustrated embodiment, multiple (N) sets of processor cores 1004A-N. Each processor unit 1002A-B may comprise on-board memory (ROM or RAM) (not shown) and off-board memory 1006A. The on-board memory may comprise primary, volatile and/or non-volatile, storage (e.g., storage directly accessible by the processor cores 1004A-N). The off-board memory 1006A-B may comprise secondary, non-volatile storage (e.g., storage that is not directly accessible by the processor cores 1004A-N), such as ROM, HDDs, SSD, flash, etc. The processor cores 1004A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host CPU 1010 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 1004 may train and/or implement different networks or subnetworks or components. For example, in one embodiment, the cores of the first processor unit 1002A may implement some of the small networks in block 932 and the second processor unit 1002B may implement others of the small networks in block 932. As another example, another multiple processor unit 1002C may implement an external machine learning system that is a subsystem for node 502 or node 503 of FIG. 5. In some embodiments, machine learning system 502 or machine learning system 503 may be a form of machine learning system other than a neural network. Further, different sets of cores in the first and/or second processor unit 1002A, 1002B may be responsible for different subnetworks 701, 711 or different ensemble members. One or more host processors 1010 may coordinate and control the processor units 1002A-B. The process depicted in various figures can be embodied as a set of instructions stored within a memory (e.g., an integral memory of the processing units 1002A, 1002B or an off board memory 1006A couple to the processing units 1002A, 1002B or other processing units) coupled to one or more processors (e.g., at least one of the sets of processor cores 1004A-N of the processing units 1002A, 1002B or another processor(s) communicatively coupled to the processing units 1002A, 1002B), such that, when executed by the one or more processors, the instructions cause the processors to perform the aforementioned process by, for example, controlling the machine learning systems 701, 711 stored in the processing units 1002A, 1002B.

In other embodiments, the computer system 1000 could be implemented with one processor unit. In embodiments where there are multiple processor units, the processor units could be co-located or distributed. For example, the processor units may be interconnected by data networks, such as a LAN, WAN, the Internet, etc., using suitable wired and/or wireless data communication links. Data may be shared between the various processing units using suitable data links, such as data buses (preferably high-speed data buses) or network links (e.g., Ethernet).

The software for the various computer systems described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, CUDA® (CUDA), Fortran, JAVA® (Java), Lisp, Pascal, Object Pascal, Haskell, ML; and examples of scripting languages include Bourne script, JAVASCRIPT®, PYTHON®, Ruby, LAU® (Lua), PHP, and PERL® (Perl).

FIG. 11 is a diagram of a small, illustrative example of a mixed-node neural network of the type described herein. Typically, a neural network is trained by stochastic gradient descent based on a computational procedure called "back propagation," which is well known to those skilled in the art of training neural networks. More specifically, for each item of training data, the computer system first does a forward computation of the activation value of each node in the network and then does a backward computation of estimates of the derivatives of the error function based on the chain rule of calculus. Various embodiments of the invention train a neural network with computations comprising: (1) a forward computation of the activation value of each node, (2) a backward computation based on the chain rule of calculus applied to a proper subset of the connections in the network, and (3) a backward computation that blocks back propagation on some of the connections and that violates the chain rule of calculus. The propagation blocking rules are based on several special, non-standard node types that are shown in FIG. 11.

A deep feed-forward neural network comprises a set of input variables that, depending on the context, may be described simply as input variables or may be described as the activation values of a layer of input nodes. The deep neural network further comprises a layer of output nodes and one or more inner layers.

The network further comprises connections between pairs of nodes. In a feed forward network, each connection is represented by a directed arc with the condition that there is no chain of directed arcs and nodes that forms a cycle back to the first node in the chain. Thus, any feed forward neural network is also a directed acyclic graph. A network in which there is one or more cyclic chains is called a recurrent neural network. In some embodiments, a feed forward neural network is created from a recurrent neural network by "unrolling" the recurrent neural network, that is by making multiple copies of the network structure with directed arcs that would otherwise create a cycle being directed to the next copy of the network instead.

In FIG. 11, the illustrated network is a more specialized network comprising several special types of nodes that are described herein. Circles represent normal neural network nodes. Diamonds represent error judgment nodes, as discussed in association with FIGS. 1, 2 and 3 and others. Pentagons represent combining nodes with selective back propagation, as discussed in association with FIGS. 1, 2, and 3 and others. Squares represent performance progress judgment nodes, as discussed in association with FIG. 6 and others. Truncated pyramid quadrilaterals represent nodes or subsystems such as nodes/subsystems 502 and 503 of FIG. 5. Hexagons represent soft fixed difference combining nodes with selective back propagation, such as 504 in FIG. 5. Upside down truncated pyramids represent look-ahead judgment nodes.

Arrows with solid black lines represent normal feed forward connections. Generally, each feed forward connection has an associated learned parameter representing the "weight" of the connection. In computations with a feed forward neural network, the computer system computes an activation value for each node proceeding forward along each directed arc in the direction of the arrow. In computing the activation of a given node, the computer system waits until the activation computation has been completed for each node that has an outgoing directed arc that connects as an incoming arc to the given node. The computer system then computes the activation of the given node. The activation function of a node may be any function of the input values. Typically, the activation value of a node is a non-linear function of the weighted sum in which the weight of the connection is multiplies by the activation value of the source node of the connection. The computer system computes the weighted sum of the input values and then computes the activation of the given node as a function of a single variable where the variable is the weighted sum. There are also several other types of nodes, such as a MAX node for which the computer systems computes the maximum of the activation values of its source nodes and softmax nodes sets with a computation that results in each node having an activation with a positive value and with the activation values summed over the set of nodes summing to 1. All these node types are considered "normal" nodes and are drawn as circles in FIG. 11.

In the prior art, training of a feed forward neural network is typically done by stochastic gradient descent based on gradient estimates and learning parameter updates computed for each mini-batch of training data. The gradient estimate for a mini-batch is an accumulation of gradient estimates for each of the data items in the mini-batch. The gradient estimate for a single data item is computed by first computing the activation of each node in the network, as described in the previous paragraph and computing the estimate of the gradient backward through the network proceeding along each arc in the opposite direction from the arrow. This backward computation is called "back propagation." The back propagation computes the partial derivatives of the error function of the objective, applying the chain rule of calculus. Various embodiments of the invention intervene in the back-propagation operation, blocking the back propagation for certain arcs under certain conditions. This disruption of the back-propagation computation is herein called "selective back propagation."

An arrow with a dot-dash line in FIG. 11 is a connection with selective back propagation. The connections from a normal node to a combining node with selective back propagation or to a judgment node is a selective back propagation connection. All the connections to a back-propagation node of the type represented by hexagons, such as node 504 in FIG. 5, are selective back propagation connections.

An arrow with a simple dashed line does not represent a connection in the network, but rather a control. In the network illustrated in FIG. 11, the controls illustrated are the controls of a progress judgment node over the back propagation.

An arrow with a double-dot-dash line is a large-step learning control line for a look-ahead judgment node.

FIG. 12 is an illustrative embodiment that seeks to increase the performance gain that can be achieved by blocks 811-814 of FIG. 8, by blocks 942-945 of FIG. 9, or by blocks 1208-1216 of FIG. 12. In block 1201, the computer system selects or creates a subject node. The computer system may select any node that computes its activation as a linear or non-linear function of the weighted sum of the values it receives from the nodes that connect to it. In some embodiments, the computer system may create a new node with connections designed for the ability of the activation domain partition process to be especially effective. For example, the computer system may create a new node with direct connections from input nodes or nodes whose subnetworks have already been frozen. The computer system may make a copy of a node and its subnetwork for a node that has node-specific early stopping if part of the subnetwork is still be trained because it receives back propagation from unfrozen nodes outside the subnetwork. The computer may also connect the new node directly to one or more output nodes or to other nodes for which a category label is known for training data.

In block 1202, the computer system selects an objective that provides some specification for each item of training data as to whether the output of the subsystem to be built is correct or incorrect. For example, if the parent network is a classifier, the computer system may designate the set of output categories, a subset of the output categories, or the members of a partition of the set of output categories of the parent network as the target for the training in blocks 1204-1207. In a second illustrative embodiment, in block 1202, the computer system may designate, that for the purpose of the training process illustrated in FIG. 12, the subsystem being built is to distinguish data for which the partial derivation of the error function as back propagated to the subsystem is positive from data for which the partial derivative is negative. In some embodiments, in block 1202, the computer system may designate a set of categories to be classified. The set of categories may be a subset of the output categories of the full network, or they may be a subset of the categories of some inner layer softmax set which are labeled in the training data. The selected objective is just used as a surrogate to get an estimate of effectiveness of a partition, not an objective that will be optimized in final training, so the selection in block 1202 may be based on convenience.

In block 1203, the computer system defines a differentiable measure of the degree of spread between data items that represent different categories in the objective selected in block 1202. For example, the computer system may compute for each datum, called the "first datum," in a sample set of data, the minimum difference between the activation value of the first datum and the activation value of a second datum, where the minimum is taken over all choices of the second datum that have a category value different from that of the first datum. The sample of data may be the full epoch or may be a mega-batch. The computer system may then compute a measure of spread by taking the average value of this minimum difference averaged over all data in the sample as the first datum. In the illustrative embodiment, the activation value in the difference described above is the input value to the activation function of the selected node. In other embodiments, the output of the activation function may be used instead. The choice of the measure of spread is not critical to the embodiment illustrated in FIG. 12. Any reasonable measure of spread may be used.

In some embodiments, only the learned parameters of the selected node and its subnetwork are updated in the loop from block 1204 to block 1207, updates of other learned parameters are blocked.

In block 1204, the computer system sorts the data by value of the activation. In block 1205, the computer system computes the estimated gradient of a combined cost function that is a weighted sum of the error function for the parent network and the negative of the measure of spread. The computer system sums the estimated combined gradient over each datum in a mini-batch. In block 1206, the computer system updates the learned parameters, at least those in the subnetwork of the selected node.

The purpose of the training in blocks 1205-1207 is to increase the spread among the activations of the data in the sample while avoiding significant degradation in the error function of the parent network. The measure of spread is a look-ahead estimate of the effectiveness of the process from block 1208 to block 1216.

In block 1207, the computer system tests whether the learned parameters being trained have reached a condition of stationarity or early stopping. If not, the computer system returns to step 1204, if so, the computer system proceeds to step 1208. Generally, there will be little or no change in the sort order when the computer system loops back to step 1204, so in the new computation of the sort in block 1204, the computer only makes the necessary few changes.

In block 1208, the computer again sorts the data. In block 1209, the computer system chooses intervals. In an illustrative embodiment, the computer system chooses the intervals based on the function $f(\ )=\Sigma_{i,\ x_i<x}\partial E/\partial F_i$, where $x_i$ is the input to the activation of the selected node for the i-th datum and $\partial E/\partial F_i$ is the partial derivation of the error function for the parent network with respect to the output of the activation function of the selected node for the i-th datum. In the illustrative embodiment, each interval boundary is placed at a local maximum or local minimum of the function $f(x)$. However, the system design may specify a selection process that chooses fewer intervals. In one illustrative embodiment, between any two adjacent zero crossings of function $f(x)$, the only interval boundary chosen is the local maximum or minimum that has the maximum magnitude of all local maxima or minima between those two zero crossings. In some embodiments, a plurality of choices of the intervals are implemented and tested, with the final choice being determined by a price-performance judgment node as in block 959 of FIG. 9.

In the illustrative embodiment, the computer system implements a data switch based on the selected node in block 1210 and creates interval-specific nodes in block 1211. That is, in subsequent feed forward activation computations, the computer system sends the input received by the data switch for a datum to an interval-specific node only if the value of the input to the switch lies within the interval of the domain of the activation function for the selected node that corresponds to the interval associated with the interval-specific node. Further details relating to embodiments of the creation of internal-specific nodes are discussed in association with blocks 812 and 813 of FIG. 8, including the specification of their activation functions. In an illustrative embodiment of FIG. 12, it is preferred that the activation function is defined to be linear outside the designated interval, with a positive slope.

In block 1212, the computer system optionally adds an error judgment node to judge the subsystem of interval-specific nodes. In some embodiments, in block 1213, the computer system adds an optional summation node in which the computer system computes a weighted sum of the outputs of the interval-specific nodes. In this embodiment, the computer system may, with a probability greater than zero, send the input to the data switch to the interval-specific node for an interval adjacent to the nominal interval. This leaky-switch operation serves as a regularizer on the training process.

In block 1214, the computer system implements regular mini-batch training based on stochastic gradient descent training of the network that has been constructed. Mini-batch stochastic gradient descent is well-known to those skilled in the art of training neural networks.

In block 1215, the computer system tests for a condition of stationarity or node-specific early stopping. If neither condition exists, the computer system returns to block 1214 to continue the training. If either condition is met, the computer system proceeds to block 1216.

Block 1216 represents the collection of data pair examples for another aspect of the invention, the capability to create example-based sensible, decision boundaries that tend to be robust and easy to understand, illustrated in FIG. 13.

FIG. 13 shows an illustrative embodiment of an aspect of the invention that is aimed at creating simple, sensible boundaries that are also more robust and easier to understand and interpret. In block 1301, the computer system trains a network comprising one or more data switches. For the embodiment illustrated in FIG. 13, it does not matter how the computer system obtained and trains the network with data switches. The data switches may have been in the original design of the network. The computer system may have created the data switches by the embodiments illustrated in FIGS. 8, 9 and 12, or by other means.

In block 1302, the computer system records one or more lists of close data pair sets. These close data pair sets may be recorded during training, as in block 1216 in FIG. 12, or they may be found during search and analysis after normal training is completed. Close data pairs may be found by selecting a node and sorting the data based on the input value to the activation function of the node. If the node has been trained to near stationarity, there will be points in the domain of the activation function of the selected node that have one or more data pairs with opposite signs for the derivative of the error function of the parent network. Such a data pair is considered to be a close data pair because the difference between the input to the activation function of the selected node for the two members of the data is small in magnitude.

In block 1303, the computer system selects a pair of categories to be distinguished. The process from block 1303 to block 1309 may be repeated multiple time for the same pair of categories and may be repeated for multiple pairs of categories desired to be distinguished.

In block 1304, the computer system selects one or more lists of close data pairs comprising data from the two categories selected in block 1303. In block 1305, the computer system trains one or more robust discriminators of the two categories selected in block 1303 using the data in the data pairs selected in block 1304 as training data. The discriminator has the task of robustly separating the close data pairs. In block 1305, the computer system may make various choices to make the discriminator more robust. The discriminator to be trained in block 1305 is not necessarily a neural network. For example, in block 1305, the computer system may train a discriminator with margin, such as a support vector machine. As another example, in block 1305, the computer system may train a node with a bounded ReLU activation function. The computer system may limit the number of input nodes to the subnetwork of the discriminator. As yet another example, in block 1305, the computer system may train a node with a perceptron activation function or other piecewise constant activation function to increase robustness against small incremental changes. The computer system may choose as an input or output node for the discriminator one or more nodes of an easy to interpret structure such as those added to the network in block 900 of FIG. 9, or other structure in the network with limited dimensionality or limited degrees of freedom. The computer system may design the discriminator to comprise a node added to the network in block 960 of FIG. 9.

In block 1306, the computer system adds the decision boundary of the discriminator trained in block 1305 to an inventory of sensible decision boundaries. From block 1306, the computer system may loop back to block 1303 to select a different pair of categories or the same pair of categories with a different selection to be made in block 1304. If a criterion has been met for the selection of different pairs of categories and different lists of close pairs, the computer system proceeds to block 1307.

In block 1307, the computer system selects data from the development test data of the network trained in block 1301 to train the comparative judgment nodes in block 1310. In block 1308, the computer system creates one or more adversarial examples. An adversarial example is a data example that has been designed to cause a classifier to make a mistake. More specifically, in block 1307, the computer system attempts to design one or more adversarial examples such that a person would easily recognize the adversarial example correctly, but the network classifier misrecognizes the adversarial example. For such an example, the person would say that the decision by the network classifier is not sensible.

In block 1309, the computer system selects data examples in the training data and development test data that the computer system judges as potentially causing overfitting or on which there is an error that is potentially caused by overfitting. The computer system may make the judgment of potential overfitting based on various criteria. For example, the computer system may compare the performance of the network when the data example is included or excluded from the training data. The performance test may be based on development test data since the data will not be used for training the network classifier or any of the discriminators because the network and the discriminators are already trained in blocks 1301-1306. The training of the comparative judgment node in block 1310 does not back propagate any training to the network classifier or to any of the robust discriminators.

In block 1310, the computer system constructs and trains a comparative judgment node such as node 702 in FIG. 7. In an illustrative embodiment, the set of subsystems being judged by the comparative judgment node comprises the network trained in block 1301, constrained to data selected by one alternative selection of the data switches and comprises one or more of the discriminators in the sensible boundary inventory created in block 1306. In some embodiments, the computer system constructs and trains a separate comparative judgment node for each alternative selection of the data switches. The computer system trains each comparative judgment node and its associated combining node to override or not override the output classification of the network trained in block 1301 by output classification determined by one of the discriminators trained in block 1305 based on the training data obtained in blocks 1307, 1308 and 1309.

The embodiments described above address many of the problems of existing machine learning systems. For example, the error judgment nodes (FIGS. 1, 2 and 3) and the performance progress judgment nodes (FIG. 6) both directly provide a degree of introspection for the network. They also make it easier to understand and interpret the network. Also, the node-specific error analysis of FIG. 4 makes the network easier to understand, while the layer-by-layer incremental growth method illustrated in FIG. 9 makes the training process easier to understand. Also, the targeted error correction of error judgment nodes (FIGS. 1, 2 and 3) is easier to understand than correcting errors through many iterations of gradient descent, as in existing machine learning systems. Also, the structures added in block 900 of FIG. 9 may increase the interpretability of the network. Still further, building a network from many small networks with individual objectives as in blocks 932-934 of FIG. 9 makes the training easier to understand and makes the final network easier to interpret. Also, a network comprising a cascade of small, simple subsystems with associated judgment nodes (sec FIGS. 2, 3, 5B, 7) may be easier to interpret.

Embodiments of the present invention also address the problem of myopic, small-step gradient descent and the need for faster training. For example, a combining node with selective back propagation may be specified without gradient descent training (FIGS. 1, 2 and 3). Also, the mega-batch statistics accumulation of FIG. 8 enables large-step updates, while the mega-batch data sorting methods of FIGS. 8 and 12 enable a form of training that cannot be done by gradient descent alone. In addition, integration of separately trained subsystems as in FIGS. 5 and 9 facilitates faster training, as does escaping from near stationarity (FIGS. 6, 8 and 9). Also, the node-specific error analysis of FIG. 4 makes the network easier to understand and, combined with the targeted error correction of error judgment nodes (FIGS. 1, 2 and 3), enables faster, more effective learning. Also, the layer-by-layer incremental growth training strategy of blocks 922, 923 and 924 in FIG. 9 with layers comprising error judgment nodes and combining nodes with selective back propagation facilitates building a network with an arbitrarily large number of layers quickly. In addition, a network comprising a cascade of small, simple subsystems with associated judgment nodes (FIGS. 2, 3, 5B, 7) can facilitate faster training.

Another benefit that is realizable through embodiments of the present invention is more explicit representation of knowledge. The example-based learning illustrated in FIG. 5 represents knowledge in a form that is easier to understand and to communicate, both to humans and to other machine learning system. It also gives an ability to integrate other types of machine learning system into the network. Also, the back propagation of tags illustrated in FIG. 5B allow the training to be related to explicit knowledge representations such as ontologies, mercologies, grammars and semantic networks. Still further, the many-small-network embodiment of block 932 in FIG. 9 enables more explicit representation of knowledge, and the structure added in block 900 of FIG. 9 may be used for more explicit representation of knowledge.

Other benefits that are realizable through embodiments of the present invention include robustness against adversarial attacks and the creation of decision boundaries that make sense to a human observer. The example-based subsystem training of FIG. 5 enables designing small subsystems with simpler, more robust decision boundaries. Also, the integration of machine learning systems of different types further increases the ability to create more sensible decision boundaries. The method of block 932 in FIG. 9 of building a network of many small systems also enables creating simpler, more sensible decision boundaries. Still further, the incremental growth strategy of blocks 922, 923 and 924, comprising nodes with perceptron and other step functions as activation functions and further comprising error judgment nodes and combining nodes with selective back propagation, enables building and training multi-layer networks of perceptrons and other step functions. The piecewise constant activation functions are robust against small changes in the input data. Also, the combination of a first, simpler node and subsystem that does not attempt to correct all errors with a separate error judgment node is more robust than forcing the first node and subsystem to attempt to correct all errors (FIGS. 1, 2 and 3). In addition, the construction of sensible boundaries illustrated in FIG. 13 directly constructs decision boundaries that make sense and that may be more robust.

Another benefit provided with the present invention is back propagation based on the cause of an error or close call. The embodiments of back propagation with tags illustrated in FIGS. 5A and 5B enable the capability of providing information about the cause of an error in the back-propagation process.

Yet another benefit is customized early stopping and avoiding overfitting. The progress performance node of FIG. 6 can enable node-specific early stopping. Still further, the use of a separate error judgment node (FIGS. 1, 2 and 3) enables the training of a node being judged to be slowed down or halted by a performance progress judgment node well before reaching the condition of overfitting the training data (FIG. 6). Also, price-performance judgment nodes (block 959 in FIG. 9) may help prevent a network being trained from reaching a condition of overfitting.

Yet another benefit is diversity of ensembles. An ensemble-like network with a cascade of subsystems in which each member comprises an associated error judgment node or comparative judgment node and an associated combining node with selective back propagation (FIGS. 2, 3, 5B and 7) may be able to maintain diversity that would be diluted by an ensemble-combining rule or node that is trained by gradient descent with back propagation that follows the chain rule of calculus.

In general aspect, therefore, the present invention is directed to computer systems and methods for training a neural network, where the neural network comprises multiple layers, and wherein each layer comprises at least one node, such that the neural network comprises at least first and second nodes. The method comprises performing, by a computer system, multiple training iterations for the neural network, where each training iteration comprises, for each data item in a set of training data items: (i) a forward computation, layer-by-layer, through the neural network, wherein the forward computation comprises computing an activation value for each node of the neural network, wherein the activation value of the second node is computed, in part, based on the activation value of the first node; and (ii) after performing the forward computation, a backward propagation, layer-by-layer, through the neural network, of estimated partial derivatives of an error function of an objective, wherein the backward propagation comprises blocking, by the computer system, for at least some of the data items, backward propagation of the estimated partial derivatives from the second node to the first node.

In various implementations, blocking the backward propagation comprises blocking, by the computer system, the backward propagation of the estimated partial derivatives from the second node to the first node for all data items in the set of training data items. Also, training the neural network can comprise non-updating connection weights for the second node for at least some of the multiple training iterations.

According to various implementations, the neural network comprises an datum-specific performance prediction node, such that, for each data item in the set of training data items, an activation value of the datum-specific performance prediction node comprises a value that represents a judgment of whether the first node has a correct activation value for the data item. Also, an activation value for the second node may be computed, for each data item in the set of training data items, based on the activation values of the first node and the datum-specific performance prediction node.

According to various implementations, the first node is an output node of the neural network. According to other implementations, the first node is on an inner layer of the neural network. Also, the datum-specific performance prediction node can comprise an error judgment node.

In various implementations, the method further comprises, prior to performing the multiple training iterations: (i) iteratively training, at least partially, by the computer system, in a preliminary training phase, the neural network using stochastic gradient descent, wherein the neural network comprises the first node during the preliminary training phase, does not comprise the second node during the preliminary training phase, and does not comprise the datum-specific performance prediction node during the preliminary training phase; and (ii) after the preliminary training phase, adding, by the computer system, the second node and the error judgment to the neural network.

According to various implementations, the first node has direct connections from one or more nodes, which cases the step of adding the datum-specific performance prediction node can comprise adding, by the computer system, the datum-specific performance prediction node such that the datum-specific performance prediction node has direct connections from the one or more nodes. According to various implementations, adding the datum-specific performance prediction node comprises adding, by the computer system, the datum-specific performance prediction node such that the datum-specific performance prediction node is a one-level discriminator node that has direct connections to input data for the neural network. According to various implementations, the method further comprises, after adding the datum-specific performance prediction node, training the datum-specific performance prediction node in isolation from a rest of the neural network.

According to various implementations, the activation value of the second node equals the activation value of the first node for each data item in the set of training data items where activation value of the datum-specific performance prediction node indicates that the activation value of the first node is correct for the data item; and the activation value of the second node does not equal the activation value of the first node for each data item in the set of training data items where activation value of the datum-specific performance prediction node indicates that the activation value of the first node is incorrect for the data item. For example, the activation value of the second node can be an opposite of the activation value of the first node for each data item in the set of training data items where the activation value of the datum-specific performance prediction node indicates that the activation value of the first node is incorrect for the data item.

According to various implementations, the activation value of the second node equals the activation value of the first node for each data item in the set of training data items where activation value of the datum-specific performance prediction node indicates that the activation value of the first node is correct for the data item; and the activation value of the second node does not equal the activation value of the first node for each data item in the set of training data items where activation value of the datum-specific performance prediction node indicates that the activation value of the first node is incorrect for the data item According to various implementations, the method further comprises training, by the computer system, the datum-specific performance prediction node so that the activation values of the second node match a target. For example, the first node can be on an inner layer of the neural network, in which case the method can further comprise determining, by the computer system, a local objective for the first node, such that training the datum-specific performance prediction node comprises training the datum-specific performance prediction node so that the activation values of the match the local objective. The local objective for the first node may be determined based on how an estimate of a partial derivative for the first node would affect a gradient descent update for the first node.

According to various implementations, the second node comprises a first combining node, the datum-specific performance prediction node comprises a first datum-specific performance prediction node, the neural network further comprises a second combining node and a second datum-specific performance prediction node. In such an implementation, an activation value of the second datum-specific performance prediction node comprises, for each data item in the set of training data items, a value that represents a judgment of whether the first combining node has a correct activation value for the data item; and an activation value for the second combining node is computed, for each data item in the set of training data items, based on the activation values of the first combining node and the second datum-specific performance prediction node.

According to various implementations, an activation function of the first node comprises a threshold value and the neural network comprises first and second conditional datum-specific performance prediction nodes, such that, for each data item in the set of training data items: (i) an activation value of the first conditional datum-specific performance prediction node comprises a value that represents a judgment of whether the first node has a correct activation value for the data item upon a condition that the activation value for the first node is less than the threshold value; and (ii) an activation value of the conditional datum-specific performance prediction node comprises a value that represents a judgment of whether the first node has a correct activation value for the data item upon a condition that the activation value for the first node is greater than the threshold value. Also, the second node can comprise first and second selective combining nodes, such that: (i) an activation value for the first selective combining node is computed, for each data item in the set of training data items where the activation value for the first node is less than the threshold value, based on the activation values of the first node and the first conditional datum-specific performance prediction node; and (ii) an activation value for the second selective combining node is computed, for each data item in the set of training data items where the activation value for the first node is greater than the threshold value, based on the activation values of the first node and the second conditional datum-specific performance prediction node.

According to various implementations, the network comprises a third node, such that the second node has direct connections to each of the first and third nodes. In such an implementation, performing the backward propagation can comprise blocking, by the computer system back propagation of the estimated partial derivatives: (i) from the second node to the first node for each training data item in the set of training data items upon a determination by the computer system that a sign of the partial derivative of the error function with respect to the activation value of the second node is positive for the training data item; and (ii) from the second node to the third node for each training data item in the set of training data items upon a determination by the computer system that the sign of the partial derivative of the error function with respect to the activation value of the second node is negative for the training data item. In various implementations, the second node is a discriminator node; the first node is trained as a detector to detect examples in a category; and the third node is trained as a detector to detect counter examples to the category detected by the first node. In such implementations, training the neural network comprises: fixing a connection weight for the connection from the first node to the second node to a fixed value; and fixing a connection weight for the connection from the third node to the second node to an opposite of the fixed value.

According to various implementations, iteratively training the neural network in the preliminary training phase comprises: accumulating performance statistics for the first node over multiple preliminary training iterations; determining whether the first nodes is at or near a stationary point in the preliminary training phase; and upon a determination that the performance of the first node is at or near a stationary point, adding the second node and the datum-specific performance prediction node to the neural network. In such an implementation, determining whether the first nodes is at or near a stationary point in the preliminary training phase can comprise determining whether the first node is at or near a stationary point based on a magnitude of change of learned parameters for the first node over a plurality of training data items in the preliminary training phase. Also, where the first node is on an inner layer of the neural network, the method can further comprise determining, by the computer system, a local objective for the first node. In that case, iteratively training the neural network in the preliminary training phase can comprise: determining whether performance of the first node is degrading in the preliminary training phase relative to a local objective applicable to the first node; and upon a determination that the performance of the first node is degrading, stopping back-propagation of estimated partial derivatives to the first node, without stopping back-propagation of estimated partial derivatives to other nodes of the neural network.

According to various implementations, the activation value of the second node is computed, in part, based on the activation value of the first node and an activation value of a third node. In such implementations, performing the backward propagation can comprise blocking, by the computer system, for at least some of the data items, backward propagation of the estimated partial derivatives from the second node to the first node and to the third node. Also in such implementations, the neural network comprises a machine learning judgment component that has direct connections to the first and third nodes. In that case, an activation value for the second node can be determined: to be the activation value of the first node upon a condition that the activation value of the first node equals an activation value of the third node; and based on an activation value of the machine learning judgment component upon a condition that the activation value of the first node does not equal the activation value of the third node. In various implementations, the machine learning judgment component is trained to predict which of the first and third nodes is correct on any training datum on which the activation values of the first and third nodes disagree.

In another general aspect, the method of training the neural network comprises performing, by a computer system, a forward computation, layer-by-layer, through the neural network, wherein the forward computation comprises computing an activation value for each node of the neural network, wherein the activation value of a second node is computed, in part, based on a first input from a first machine learning model and a second input from a second machine learning model. The method also comprises, after performing the forward computation, performing, by a computer system, a backward propagation, layer-by-layer, through the neural network, of estimated partial derivatives of an error function of an objective. In these method steps, performing the backward propagation comprises blocking, by the computer system back propagation of the estimated partial derivatives: (i) from the first node to the first machine learning model for each training data item in the set of training data items upon a determination by the computer system that a sign of the partial derivative of the error function with respect to the activation value of the first node is positive for the training data item; and (ii) from the first node to the second machine learning model for each training data item in the set of training data items upon a determination by the computer system that the sign of the partial derivative of the error function with respect to the activation value of the first node is negative for the training data item.

According to various implementations, training the neural network comprises training the neural network such that two back-propagated estimated partial derivatives are not added if the two back-propagated estimated partial derivatives have opposite signs. Also, performing the backward propagation can comprise back-propagating packets, where each packet comprises an estimate partial derivative and a tag, wherein each tag has a tag value; and training the neural network such that two back-propagated estimated partial derivatives in two separate packets are not added if the tags for the two separate packets have different tag values. In various implementations, the first node is a discriminator node; the first machine learning model is trained as a detector to detect examples in a category; and the second machine learning model is trained as a detector to detect counter examples to the category detected by the first machine learning model.

In another general aspect, the present invention is directed to a computer system for training a neural network, where the neural network comprises multiple layers, and wherein each layer comprises at least one node, such that the neural network comprises a first node. The computer system comprises a processor core and a memory that stores computer instructions that, when executed by the processor core, configures the processor core to perform multiple training iterations for the neural network by: performing a forward computation, layer-by-layer, through the neural network, wherein the forward computation comprises computing an activation value for each node of the neural network, wherein the activation value of the second node is computed, in part, based on the activation value of the first node; after performing the forward computation, performing, by a computer system, a backward propagation, layer-by-layer, through the neural network, of estimated partial derivatives of an error function of an objective for the neural network; accumulating performance statistics for the first node over the multiple training iterations; determining whether performance of the first node is degrading over the multiple training iterations relative to a local objective applicable to the first node; and upon a determination that the performance of the first node is degrading, stopping back-propagation of estimated partial derivatives to the first node, without stopping back-propagation of estimated partial derivatives to other nodes of the neural network.

According to various implementations, the memory stores further computer instructions that configure the processor core to: determine whether the first nodes is at or near a stationary point in the training; and upon a determination that the performance of the first node is at or near a stationary point, add a new structure to the neural network. The new structure can comprise a combining node and a datum-specific performance prediction node. Also, the memory may also store computer instructions that configure the processor core to determine whether the first node is at or near a stationary point based on a magnitude of change of learned parameters for the first node over plurality of training data items.

In another general aspect, the memory that stores computer instructions that, when executed by the processor core, configures the processor core to, for a training data item, perform: a forward computation, layer-by-layer, through the neural network, wherein the forward computation comprises computing an activation value for each node of the neural network; and after performing the forward computation, a backward propagation, layer-by-layer, through the neural network, at least to the first node, of estimated partial derivatives of an error function of the global objective. The one or more processor cores are also configured to set the local objective of the first node for the given datum to (A) a first value upon a determination that (1) the estimated partial derivative back-propagated to the first node from the one or more higher order nodes for the given datum is positive and (2) the activation value for the first node for the given datum is below an activation threshold for the first node; to (B) the first value for the given datum upon a determination that (1) the estimated partial derivative back-propagated to the first node from the one or more higher order nodes for the given datum is negative and (2) the activation value for the first node for the given datum is below an activation threshold for the first node; or (C) set the local objective of the first node to a second value for the given datum upon a determination that the local objective is not set to the first value for the given datum.

According to various implementations, the memory further stores instructions that configure the one or more processor cores to add a datum-specific performance prediction node to the neural network, where: a datum-specific objective of the datum-specific performance prediction node, for each data item, comprises a value that represents a judgment of whether the first node has a correct activation value for the data item; the datum-specific objective of the datum-specific performance prediction node for a data item is the first value when the datum-specific performance prediction node determines that the first node has a correct activation value for the data item; and the datum-specific objective of the datum-specific performance prediction node for a data item is the second value when the datum-specific performance prediction node determines that the first node has an incorrect activation value for the data item.

According to various implementations, the memory further stores instructions that configure the one or more processor cores to block back-propagation of estimated partial derivatives from the datum-specific performance prediction node to the first node. Also, the memory can further stores instructions that configure the one or more processor cores to: add a combining node to the neural network, wherein an activation value for the second node is computed, for each data item, based on the activation values of the first node and the datum-specific performance prediction node for the data item; and block back-propagation of estimated partial derivatives from the combining node to the first node.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A method for improving robustness of a machine learning system, the method comprising:
  training, by a programmed computer system comprising one or more processor cores, one or more discriminators, wherein each of the one or more discriminators comprises a machine-learned model that is trained, through machine learning, to discriminate data into two or more categories for use in automated decision-making by the machine learning system; and
  training, by the programmed computer system, an override node to override an output of a neural network architecture of the machine learning system, wherein training the override node to override the output of the neural network architecture comprises:
    training the override node independently of the neural network architecture of the machine learning system such that training the override node does not modify learned parameters of the neural network architecture;

training the override node to detect a potentially erroneous output by the neural network architecture; and upon detection of the potentially erroneous output, changing the potentially erroneous output based on a discrimination by the one or more discriminators.

2. The method of claim 1, wherein training the override node to detect the potentially erroneous output by the neural network architecture comprises training a combination comprising the override node and the neural network architecture via gradient-based optimization, without back-propagating partial derivatives from the override node to the neural network architecture in a backpropagation phase of the gradient-based optimization.

3. The method of claim 2, wherein training the override node to detect the potentially erroneous output by the neural network architecture further comprises training a combination comprising the override node and the one or more discriminators via gradient-based optimization, without propagating partial derivatives from the override node to the one or more discriminators.

4. The method of claim 1, wherein training the override node to detect the potentially erroneous output comprises training the override node with adversarial training examples, where the neural network architecture is likely to make an error on the adversarial training examples.

5. The method of claim 4, wherein training the override node to detect the potentially erroneous output further comprises training the override node with data that causes the neural network architecture to make an error due to overfitting.

6. The method of claim 1, further comprising, prior to training the override node to override the output of the neural network architecture, training, by the computer system, the neural network architecture to perform a machine learning task.

7. The method of claim 6, wherein the neural network architecture comprises a classifier and the machine learning task comprises classification.

8. The method of claim 7, wherein:

the computer system comprises two or more banks of graphical processor unit (GPUs); training the neural network architecture comprises training the neural network architecture via gradient-based optimization; and the gradient-based optimization comprises processing training examples in parallel with the two or more banks of GPUs.

9. The method of claim 1, wherein training the one or more discriminators comprises training the one or more discriminators on close data pairs from the two or more categories, wherein each close data pair comprises first and second data items, where a difference between inputs to an activation function for a selected node of the neural network architecture for the first and second data items is less than a threshold value, and derivatives of an error function for the neural network architecture for the selected node have opposite signs for the first and second data items.

10. The method of claim 9, wherein each close data pair comprises first and second data items, where a difference between inputs to an activation function for a selected node of the neural network architecture for the first and second data items is less than a threshold value, and derivatives of an error function for the neural network architecture for the selected node have opposite signs for the first and second data items.

11. The method of claim 1, wherein at least one of the one or more discriminators comprises a neural network.

12. The method of claim 1, wherein at least one of the one or more discriminators comprises a support vector machine.

13. The method of claim 1, wherein:

each of the one or more discriminators has a decision boundary; and training the override node to override the output of the neural network architecture further comprises storing, by the computer system, an inventory of the one or more decision boundaries, such that the override node is trained to change the potentially erroneous output by the neural network architecture based on a comparison of the output of the neural network architecture to the inventory of the one or more decision boundaries.

14. The method of claim 13, wherein:

training the one or more discriminators comprises training a plurality of discriminators; each of the plurality of discriminators has an associated decision boundary;

storing the inventory comprises storing an inventory comprising the plurality of associated decision boundaries for the plurality of discriminators, such that the override node is trained to change the potentially erroneous output by the neural network architecture based on a comparison of the output of the neural network architecture to the inventory comprising the plurality of associated decision boundaries.

15. The method of claim 14, wherein:

the plurality of discriminators comprise a first discriminator and a second discriminator; and the first discriminator discriminates between a different pair of categories than the second discriminator.

16. A computer system comprising:

one or more processor cores; and computer memory in communication with the one or more processor cores, wherein the computer memory stores instructions that when executed by the one or more processor cores cause the one or more processor cores to improve robustness of a machine learning system by at least performing the following steps:

training one or more discriminators, wherein each of the one or more discriminators comprises a machine-learning model that is trained through machine learning to discriminate data into two or more categories for use in automated decision-making by the machine learning system; and training an override node to override an output of a neural network architecture of the machine learning system, wherein training the override node to override the output of the neural network architecture comprises:

training the override node independently of the neural network architecture of the machine learning system such that training the override node does not modify learned parameters of the neural network architecture;

training the override node to detect a potentially erroneous output by the neural network architecture; and upon detection of the potentially erroneous output, changing the potentially erroneous output based on a discrimination by the one or more discriminators.

17. The computer system of claim 16, wherein the computer memory stores instructions that when executed by the one or more processor cores cause the one more processor cores to train the override node to detect the potentially erroneous output by the neural network architecture by training a combination comprising the override node and the neural network architecture via gradient-based optimization, without back-propagating partial derivatives from the override node to the neural network architecture in a backpropagation phase of the gradient-based optimization.

18. The computer system of claim 17, wherein the computer memory stores instructions that when executed by the one or more processor cores cause the one more processor cores to train the override node to detect the potentially erroneous output by the neural network architecture further by training a combination comprising the override node and the one or more discriminators via gradient-based optimization, without propagating partial derivatives from the override node to the one or more discriminators.

19. The computer system of claim 16, wherein the computer memory stores instructions that when executed by the one or more processor cores cause the one more processor cores to train the override node to detect the potentially erroneous output by training the override node with adversarial training examples, where the neural network architecture is likely to make an error on the adversarial training examples.

20. The computer system of claim 19, wherein the computer memory stores instructions that when executed by the one or more processor cores cause the one more processor cores to train the override node to detect the potentially erroneous output further by training the override node with data that causes the neural network architecture to make an error due to overfitting.

21. The computer system of claim 16, where the computer memory stores instructions that when executed by the one or more processor cores cause the one more processor cores to, prior to training the override node to override the output of the neural network architecture, train the neural network architecture to perform a machine learning task.

22. The computer system of claim 21, wherein the neural network architecture comprises a classifier and the machine learning task comprises classification.

23. The computer system of claim 22, wherein:
the computer system comprises two or more banks of graphical processor unit (GPUs);
training the neural network architecture comprises training the neural network architecture via gradient-based optimization; and the two or more banks of GPUs are configured to process training examples in parallel in the gradient-based optimization.

24. The computer system of claim 16, wherein:
the one or more discriminators are trained on close data pairs from the two or more categories; and
each close data pair comprises first and second data items, where a difference between inputs to an activation function for a selected node of the neural network architecture for the first and second data items is less than a threshold value, and derivatives of an error function for the neural network architecture for the selected node have opposite signs for the first and second data items.

25. The computer system of claim 16, wherein:
each of the one or more discriminators has a decision boundary; and
the computer memory stores instructions that when executed by the one or more processor cores cause the one more processor cores to train the override node to override the output of the neural network architecture further by storing an inventory of the one or more decision boundaries, such that the override node is trained to change the potentially erroneous output by the neural network architecture based on a comparison of the output of the neural network architecture to the inventory of the one or more decision boundaries.

26. The computer system of claim 25, wherein:
training the one or more discriminators comprises training a plurality of discriminators; each of the plurality of discriminators has an associated decision boundary;
storing the inventory comprises storing an inventory comprising the plurality of associated decision boundaries for the plurality of discriminators, such that the override node is trained to change the potentially erroneous output by the neural network architecture based on a comparison of the output of the neural network architecture to the inventory comprising the plurality of associated decision boundaries.

27. The computer system of claim 26, wherein:
the plurality of discriminators comprise a first discriminator and a second discriminator; and the first discriminator discriminates between a different pair of categories than the second discriminator.

* * * * *